United States Patent
Takamoto et al.

(10) Patent No.: US 9,850,147 B2
(45) Date of Patent: Dec. 26, 2017

(54) FUNCTIONAL POLYMER MEMBRANE AND METHOD OF PRODUCING THE SAME

(71) Applicant: FUJIFILM Corporation, Tokyo (JP)

(72) Inventors: Tetsufumi Takamoto, Kanagawa (JP); Akihito Amao, Kanagawa (JP); Nagisa Toihara, Kanagawa (JP); Morihito Ikeda, Kanagawa (JP); Satoshi Sano, Kanagawa (JP); Keisuke Kodama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 14/668,222

(22) Filed: Mar. 25, 2015

(65) Prior Publication Data

US 2015/0259227 A1 Sep. 17, 2015

Related U.S. Application Data

(63) Continuation of application No. PCT/JP2013/076113, filed on Sep. 26, 2013.

(30) Foreign Application Priority Data

Sep. 28, 2012 (JP) .................................. 2012-218751
Mar. 7, 2013 (JP) .................................. 2013-045951

(51) Int. Cl.
*B01D 39/00* (2006.01)
*B01D 39/14* (2006.01)
(Continued)

(52) U.S. Cl.
CPC ........ *C02F 1/4695* (2013.01); *B01D 67/0006* (2013.01); *B01D 69/02* (2013.01);
(Continued)

(58) Field of Classification Search
CPC B01D 67/0006; B01D 2325/02; B01D 69/02; B01D 69/10; B01D 71/66;
(Continued)

(56) References Cited

U.S. PATENT DOCUMENTS 8,328,023 B2 * 12/2012 Weiss .................... C08F 255/00
210/500.21
9,441,083 B2 * 9/2016 Takamoto .............. B01D 71/82
(Continued)

FOREIGN PATENT DOCUMENTS

CN 101673053 A 3/2010
CN 101676338 A 3/2010
(Continued)

OTHER PUBLICATIONS

Communication dated Sep. 29, 2015, issued by the Japan Patent Office in corresponding Japanese Application No. 2012-218751.
(Continued)

*Primary Examiner* — Ana Fortuna
(74) *Attorney, Agent, or Firm* — Sughrue Mion, PLLC

(57) ABSTRACT

A functional polymer membrane having a pore volume fraction of 0.6% or more and 3.0% or less by allowing a reaction of curing a composition containing a polymerizable compound (A) and a copolymerizable monomer (B).

20 Claims, 2 Drawing Sheets

(51) Int. Cl.
| | |
|---|---|
| B01D 71/28 | (2006.01) |
| B01D 29/46 | (2006.01) |
| B05D 5/00 | (2006.01) |
| C02F 1/469 | (2006.01) |
| B01J 47/12 | (2017.01) |
| B01D 71/40 | (2006.01) |
| B01D 71/82 | (2006.01) |
| C08F 222/38 | (2006.01) |
| B01D 67/00 | (2006.01) |
| B01D 69/10 | (2006.01) |
| B01D 71/66 | (2006.01) |
| B01D 69/02 | (2006.01) |
| C08J 5/22 | (2006.01) |

(52) U.S. Cl.
CPC ............ *B01D 69/10* (2013.01); *B01D 71/40* (2013.01); *B01D 71/66* (2013.01); *B01D 71/82* (2013.01); *B01J 47/12* (2013.01); *C08F 222/385* (2013.01); *C08J 5/2231* (2013.01); B01D 2323/30 (2013.01); B01D 2323/34 (2013.01); B01D 2323/345 (2013.01); B01D 2325/02 (2013.01); B01D 2325/20 (2013.01); B01D 2325/26 (2013.01); B01D 2325/42 (2013.01); C02F 2301/00 (2013.01); *C08J 2333/14* (2013.01)

(58) Field of Classification Search
CPC ......... B01D 61/002; B01J 47/12; B01J 39/20; B01J 41/14; C08J 5/2231; C08J 2333/14; C08J 2333/24; C08J 2333/26; C08J 5/22
See application file for complete search history.

(56) References Cited

U.S. PATENT DOCUMENTS

2003/0113603 A1* 6/2003 Highgate ............ B01D 67/0006
429/483

2014/0345456 A1* 11/2014 Sano ...................... B01D 71/64
95/51
2015/0259227 A1* 9/2015 Takamoto ............ C08F 222/385
204/296
2015/0353696 A1* 12/2015 Sano ...................... C08J 5/2231
428/220
2015/0353721 A1* 12/2015 Takamoto ................ C09D 4/00
442/59
2016/0001238 A1* 1/2016 Agui ...................... C08F 12/26
210/500.34
2016/0354771 A1* 12/2016 Inomata ................... B01J 39/20
2016/0369073 A1* 12/2016 Inoue .................. H01M 8/1023

FOREIGN PATENT DOCUMENTS

| JP | 2005-353534 A | | 12/2005 |
|---|---|---|---|
| JP | 2007-031372 A | | 2/2007 |
| JP | 2007-035599 A | | 2/2007 |
| JP | 4611834 B2 | | 1/2011 |
| JP | 2007-03599 | * | 8/2017 |
| WO | 2011/025867 A1 | | 3/2011 |
| WO | 2011/073637 A1 | | 6/2011 |
| WO | 2011/073638 A1 | | 6/2011 |
| WO | 2012/133182 A1 | | 10/2012 |
| WO | 2013/008626 A1 | | 1/2013 |

OTHER PUBLICATIONS

Communication dated Sep. 29, 2015, issued by the Japan Patent Office in corresponding Japanese Application No. 2013-045951.
International Search Report for PCT/JP2013/076113 dated Nov. 12, 2013.
Communication dated Jan. 15, 2016, from the State Intellectual Property Office of People's Republic in China in application No. 201380050819.2.

* cited by examiner

FUNCTIONAL POLYMER MEMBRANE AND METHOD OF PRODUCING THE SAME

CROSS-REFERENCE TO RELATED APPLICATIONS

This application is a Continuation of PCT International Application No. PCT/JP2013/076113 filed on Sep. 26, 2013, which claims priority under 35 U.S.C. §119 (a) to Japanese Patent Application No. 2012-218751 filed on Sep. 28, 2012, and Japanese Patent Application No. 2013-045951 filed on Mar. 7, 2013. Each of the above applications is hereby expressly incorporated by reference, in its entirety, into the present application.

FIELD OF THE INVENTION

The present invention relates to a functional polymer membrane useful for an ion exchange membrane, a reverse osmosis membrane, a forward osmosis membrane, a gas separation membrane and the like; and a method of producing them.

BACKGROUND OF THE INVENTION

As a functional polymer membrane, an ion exchange membrane, a reverse osmosis membrane, a forward osmosis membrane, a gas separation membrane and the like are known as membranes having various kinds of functions.

For example, the ion exchange membrane is used in electrodeionization (EDI), continuous electrodeionization (CEDI), electrodialysis (ED), electrodialysis reversal (EDR) and the like.

The electrodeionization (EDI) is a water treatment process wherein ions are removed from aqueous liquids using an ion exchange membrane and an electrical potential to effect ion transport. It differs from other water purification technologies, such as conventional ion exchange, in that it is does not require the use of chemicals such as acids or caustic soda. EDI can be used to produce ultra pure water. The electrodialysis (ED) and the electrodialysis reversal (EDR) are electrochemical separation processes that remove ions and the like from water and other fluids.

In the ion exchange membrane, study on improvement in membrane resistance has been conducted (for example, see Patent Literature 1 to 3). In the electrodeionization (EDI), the electrodialysis (ED) and the electrodialysis reversal (EDR), deionized water in which ions and so forth are removed from water and other fluids, and concentrated water of removed ions are produced. Thus, a concentration of a fluid in contact with the ion exchange membrane changes in the separation process. Therefore, further improvement in performance has been required as the functional polymer membrane during contact with the fluid having the concentration in a wide range. Moreover, improvement in characteristics of the functional polymer membrane other than the ion exchange membrane has also been demanded.

CITATION LIST

Patent Literatures

Patent Literature 1: WO 2011/073637 A1
Patent Literature 2: WO 2011/073638 A1
Patent Literature 3: WO 2011/025867 A1

SUMMARY OF THE INVENTION

Problems that the Invention is to Solve

Study by the present inventors revealed that a conventional functional polymer membrane has room for allowing further improvement, for example, in membrane resistance and water permeability, and has possibility of significantly enhancing a function as the functional polymer membrane by further reducing the membrane resistance and the water permeability.

The present invention is contemplated for providing a functional polymer membrane that is excellent in ionic permselectivity (transport number), and low in water permeability and electrical resistance and can be used in wide applications, and a method of producing the same. Above all, in particular, the present invention is contemplated for providing, as an ion exchange membrane, a functional polymer membrane that is low in the membrane resistance and the water permeability, and excellent in ion transport number, and a method of producing the same.

Means to Solve the Problem

In such situation, the present inventors have diligently conducted study on membrane structure suitable for a functional polymer membrane, and as a result, have found that a functional polymer membrane prepared by allowing a reaction of curing a composition containing a polymerizable compound having specific structure and adjusting a pore volume fraction to a predetermined range shows not only good ion transport number, but also low electrical resistance, upon using as the ion exchange membrane, and low water permeability. The present invention has been completed based on the findings above.

That is, the above-described problems of the present invention were solved by the following means.

<1> A functional polymer membrane having a pore volume fraction of 0.6% or more and 3.0% or less prepared by allowing a reaction of curing a composition containing a polymerizable compound (A) and a copolymerizable monomer (B).

<2> The functional polymer membrane described in the above item <1>, wherein the polymerizable compound (A) has at least one of ethylenically unsaturated group in its molecule, and is a water soluble.

<3> The functional polymer membrane described in the above item <1> or <2>, wherein the polymerizable compound (A) is a compound selected from the group consisting of a (meth)acrylate compound, a (meth)acrylamide compound, a vinyl ether compound, an aromatic vinyl compound, an N-vinylamide compound, and an allyl compound.

<4> The functional polymer membrane described in any one of the above items <1> to <3>, wherein the polymerizable compound (A) is a compound represented by Formula (1), and wherein the copolymerizable monomer (B) is a monofunctional polymerizable compound,

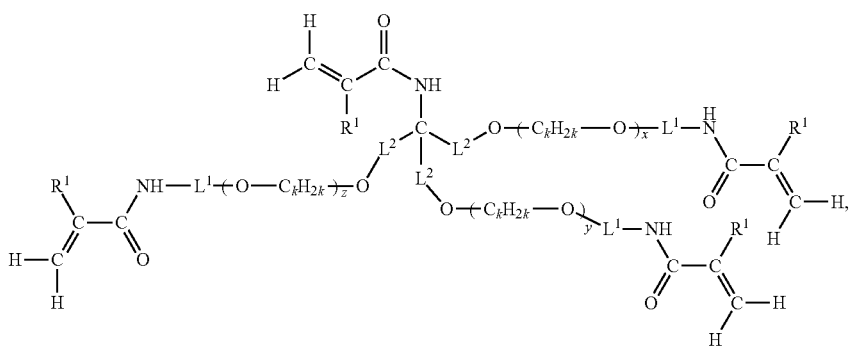

Formula (1)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

<5> The functional polymer membrane described in any one of the above items <1> to <4>,
wherein molar ratio r of the polymerizable compound (A) to the copolymerizable monomer (B) is 0.1<r<3.5.

<6> The functional polymer membrane described in any one of the above items <1> to <5>.
wherein the copolymerizable monomer (B) has a dissociative group.

<7> The functional polymer membrane described in the above item <6>, wherein the dissociative group is selected from the group consisting of a sulfo group or a salt thereof, a carboxy group or a salt thereof, an ammonio group and a pyridinio group.

<8> The functional polymer membrane described in the above item <6> or <7>, wherein the dissociative group is a sulfo group or a salt thereof, or a carboxy group or a salt thereof.

<9> The functional polymer membrane described in any one of the above items <1> to <8>,
wherein the copolymerizable monomer (B) is a (meth)acrylate compound or a (meth)acrylamide compound.

<10> The functional polymer membrane described in any one of the above items <1> to <9>, wherein a solid content of the polymerizable compound (A) is 10 to 85 parts by mass based on 100 parts by mass of the total solid content in the composition.

<11> The functional polymer membrane described in any one of the above items <1> to <10>, which contains a support.

<12> The functional polymer membrane described in the above item <11>, wherein the support is a synthetic woven fabric or a synthetic non-woven fabric, a sponge-like film or a film having microscopic through-holes.

<13> The functional polymer membrane described in the above item <11> or <12>, wherein the support is made from polyolefin.

<14> The functional polymer membrane described in any one of the above items <1> to <13>, wherein the functional polymer membrane is an ion exchange membrane, a reverse osmosis membrane, a forward osmosis membrane, or a gas separation membrane.

<15> A method of producing a functional polymer membrane, containing the step of:
allowing a reaction of curing a composition containing a polymerizable compound (A) and a copolymerizable monomer (B), thereby adjusting a pore volume fraction to 0.6% or more and 3.0% or less.

<16> The method of producing a functional polymer membrane described in the above item <15>
wherein the polymerizable compound (A) is a compound represented by Formula (1), and
wherein the copolymerizable monomer (B) is a monofunctional polymerizable compound,

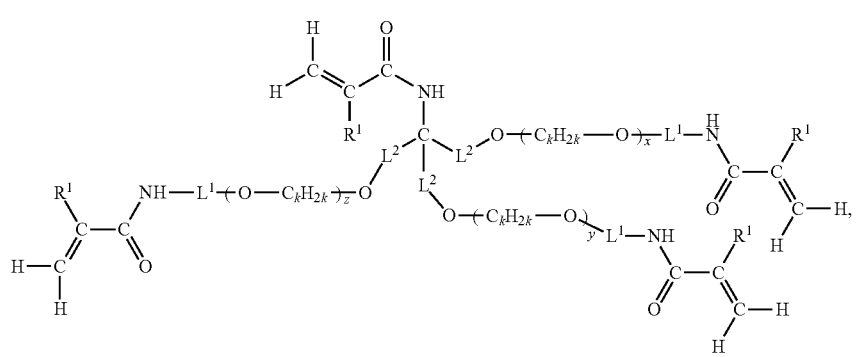

Formula (1)

wherein R¹ represents a hydrogen atom or a methyl group; L¹ represents a linear or branched alkylene group having 2 to 4 carbon atoms; in L¹, the oxygen atom and nitrogen atom bonded to both ends of L¹ do not bind to the same carbon atom of L¹; L² represents a divalent linking group; k represents 2 or 3; x, y and z each independently represent an integer of from 0 to 6; and (x+y+z) satisfies from 0 to 18.

<17> The method of producing a functional polymer membrane described in the above item <15> or <16>, wherein a solvent (C) is contained in the composition, and a content of the solvent (C) is 1 to 35 parts by mass based on 100 parts by mass of the total mass of the composition.

<18> The method of producing a functional polymer membrane described in the above item <17>, wherein the solvent (C) is water or a water-miscible solvent.

<19> The method of producing a functional polymer membrane described in any one of the above items <15> to <18>, containing the steps of:

applying and/or impregnating the composition to a support; and allowing a reaction of curing the composition to form a membrane.

<20> The method of producing a functional polymer membrane described in any one of the above items <15> to <19>, wherein the curing reaction includes a curing reaction due to polymerization of the composition by irradiating the composition with energy rays.

"Pore volume fraction" herein refers to a value calculated from the following Formula (b) when electrical resistance of the functional polymer membrane (hereinafter, referred to simply as "membrane" in several cases) is measured in NaCl solutions having five different concentrations, electrical conductivity of the membrane upon immersing the membrane into the NaCl solution having each concentration is taken as A (S/cm²), electrical conductivity per unit membrane thickness in the NaCl solution having each concentration is taken as B (S/cm²), and a y-intercept upon A on a y-axis and B on an x-axis is taken as C.

$$\text{Pore volume fraction} = (A-C)/B \quad (b)$$

Pores in the present invention are smaller than a detection limit of standard Scanning Electron Microscope (SEM), and cannot be detected even by Jeol JSM-6335F Field Emission SEM having a detection limit of 5 nm, and thus a mean pore size is presumably less than 5 nm.

Specifically, no detection can be made even through observation, for example, using Jeol JSM-6335F Field Emission SEM under conditions of applying an accelerating voltage of 2 kV, a working distance of 4 mm, an aperture of 4, a sample coated with Pt in a thickness of 1.5 nm, a magnification of 100,000 times, and a tilt of 3° in a field of view.

In addition, the pores are smaller than the detection limit of SEM, and thus the pores are also presumably interstices between atoms. In the present specification, the term "pores" means pores including the interstices between atoms.

Such pores are presumably formed by the solvent, neutralization water or a salt in the composition during curing the composition for forming the functional polymer membrane or shrinkage during curing the composition. In addition, observation conditions by SEM will be described later.

These pores are a void part in arbitrary shape, existing inside the functional polymer membrane, and include both closed pores and open pores. In addition, "closed pores" means independent pores to each other, and may be in contact with an arbitrary surface of the membrane. On the other hand, "open pores" means pores in which the closed pores are connected. In these open pores, micropores may be continued from the arbitrary surface of the membrane to other surfaces in a passage form.

Moreover, in the present specification, the term "copolymerizable monomer (B)" herein means a monomer that is copolymerized with the polymerizable compound (A), and a polymerizable compound having chemical structure different from that of the polymerizable compound (A).

In addition, in the present specification, the description "to" is used as the meaning which includes the numerical values which are written before and after thereof as the lower limit value and the upper limit value. Moreover, the term "dissociative group" means a group that is reversibly dissociable into and associable from a component atom, an ion, an atomic group or the like.

In the present specification, the term "(meth)acryl" is used to mean $-C(=O)CH=CH_2$ and/or $-C(=O)C(CH_3)=CH_2$. Moreover, the description "(meth)acrylamide" represents acrylamide and/or methacrylamide, and the description "(meth)acrylate" represents acrylate and/or methacrylate.

Moreover, in each formula, unless otherwise noted, when a plurality of groups having identical signs exist, these groups may be identical with or different from each other, and in a similar manner, when repetition of a plurality partial structure exists, the repetition means both of repetition of identical partial structure and mixture of repetition of different partial structure in a specified range.

Further, in a geometrical isomer being a substitution pattern around a double bond in each formula, for convenience of a display, even if one of the isomers is described, unless otherwise noted, the isomer may as well include an E isomer, a Z isomer or a mixture of these isomers.

In the present specification, when a substance is named by placing a word "compound" in the end, or when a specific compound is presented by a name and or a formula thereof, the name of formula is used in the meaning of the compound per se, and also a substance including a salt or ions thereof if the relevant substance has dissociable partial structure in a chemical structure formula thereof. Further, in the present specification, when a specific group of atoms or a specific compound is called by putting the term "group" at the foot of the specific group of atoms or the specific compound with respect to the substituent, the group means that the group of atoms or the compound may have further an arbitrary substituent.

Effects of the Invention

The present invention can provide a functional polymer membrane that is excellent in transport number, and low in water permeability and electrical resistance and can be used in wide applications by allowing a reaction of curing of the above-described component (A) and the above-described component (B) and adjusting a pore volume fraction of the membrane to 0.6% to 3.0%, and a method of producing the same.

Other and further features and advantages of the invention will appear more fully from the following description, appropriately referring to the accompanying drawings.

MODE FOR CARRYING OUT THE INVENTION

Figure 1:
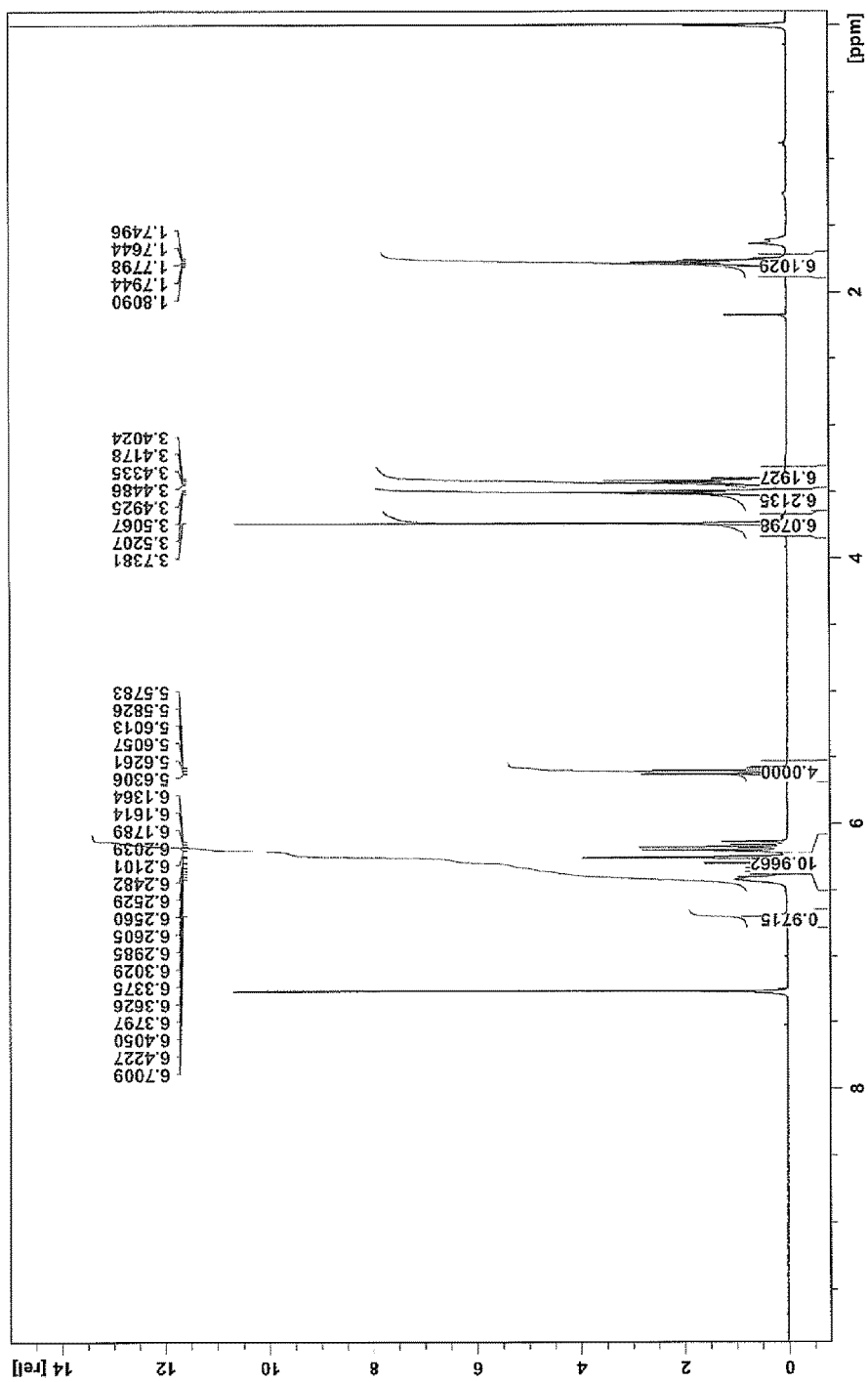
FIG. 1 is a ¹H-NMR spectrum chart of the following polymerizable compound 1.
Figure 2:
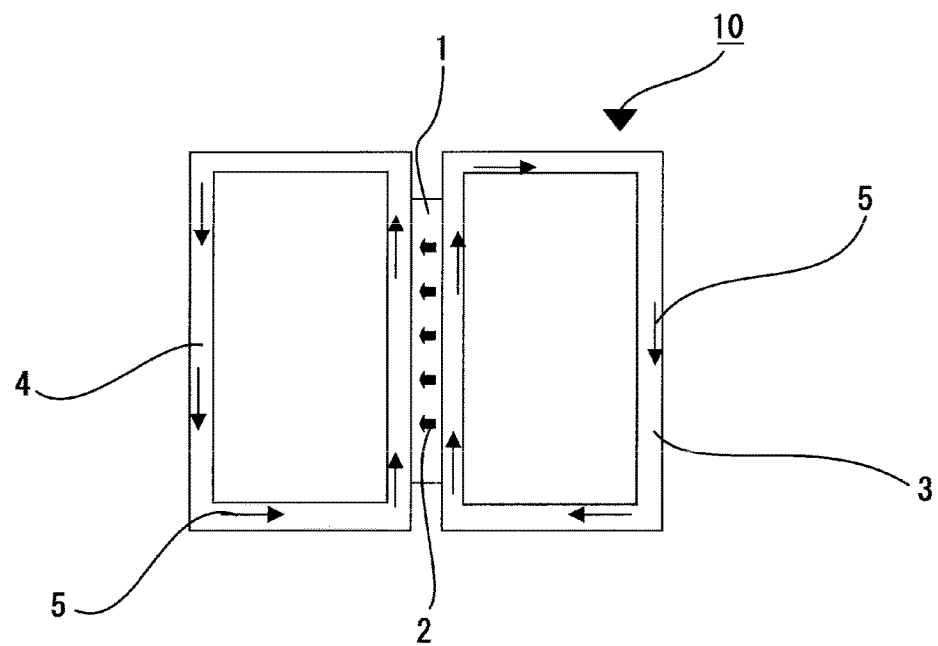
FIG. 2 schematically shows flow channels of a device for measuring water permeability of a membrane.

The functional polymer membrane (hereinafter, referred to simply as "membrane" in several cases) of the present invention can be used for performing ion exchange, reverse osmosis, forward osmosis, gas separation or the like. A preferred embodiment of the present invention will be described below by taking as an example in a case where the above-described functional polymer membrane has a function as an ion exchange membrane.

The functional polymer membrane of the present invention preferably include a cation exchange membrane or an anion exchange membrane, and particularly preferably, a cation exchange membrane.

When the membrane has a support, a thickness of the membrane is preferably, including the support, less than 1,000 μm, further preferably, 10 to 300 μm, and most preferably, 20 to 200 μm.

The functional polymer membrane of the present invention has an ion exchange capacity of, preferably, 0.3 meq/g or more, further preferably, 0.5 meq/g or more, still further preferably, 0.8 meq/g or more, particularly preferably, 1.0 meq/g or more, and most preferably, 1.2 meq/g or more, based on the total dry mass of the membrane, an arbitrary porous support that is continuously brought into contact with the resultant membrane, and a porous support and an arbitrary reinforcing material included in the membrane.

In addition, the upper limit of the ion exchange capacity is not particularly limited, but is preferably 4.0 meq/g or less. Herein, the term "meq" stands for milliequivalent.

Ionic permselectivity to the ions (a cation such as Na in the case of the cation exchange membrane, or an anion such as Cl⁻ in the case of the anion exchange membrane) in the functional polymer membrane according to the present invention exceeds preferably 0.75, further preferably, 0.8, still further preferably, 0.85, particularly preferably, 0.90, and most preferably, is near 1 being a theoretical value.

The functional polymer membrane of the present invention preferably has an electrical resistance (membrane resistance) less than 10 $\Omega \cdot cm^2$, more preferably less than 5 $\Omega \cdot cm^2$, and most preferably less than 3 $\Omega \cdot cm^2$. The lower limit of the electrical resistance is not particularly limited, but it is practically 0.12 $\Omega \cdot cm^2$ or more.

Among these, electrical resistance (membrane resistance) in a 0.5 M aqueous solution in a concentration of NaCl is preferably less than 10 $\Omega \cdot cm^2$, further preferably, less than 5 $\Omega \cdot cm^2$, and most preferably less than 3.5 $\Omega \cdot cm^2$. Electrical resistance (membrane resistance) in a 4.5 M aqueous solution in the concentration of NaCl is preferably less than 10 $\Omega \cdot cm^2$, further preferably, less than 5 $\Omega \cdot cm^2$, and most preferably less than 1.5 $\Omega \cdot cm^2$. The lower limit of electrical resistance in an aqueous solution of NaCl in each concentration is not particularly limited, but is practically 0.1 $\Omega \cdot cm^2$ or more.

In addition, the electrical resistance of the membrane and the ionic permselectivity thereof in water can be measured by the methods described in Membrane Science, 319, pp. 217-218 (2008), and Experimental method in membrane science, pp. 193-195 (1984), authored by Masayuki Nakagaki.

A swelling ratio (ratio of a dimensional change by swelling) of a functional composite membrane in water according to the present invention is preferably less than 30%, further preferably, less than 15%, and particularly preferably, less than 8%. The lower limit of the swelling ratio is not particularly limited, but is preferably % or more. The swelling ratio can be controlled by selecting a proper parameter such as a degree of cure and a degree of polymerization in a curing stage.

The water uptake of the functional composite membrane of the present invention is preferably less than 70% more preferably less than 50%, further preferably less than 40%, and especially preferably less than 30%, based on mass of dry membrane. The lower limit of the water uptake is not particularly limited, but it is practically 5% or more.

The water permeability of the functional polymer membrane of the present invention is preferably $20 \times 10^{-5}$ mL/m²/Pa/hr or less, more preferably $15 \times 10^{-5}$ mL/m²/Pa/hr or less, further preferably $12 \times 10^{-5}$ mL/m²/Pa/hr or less, and most preferably $10 \times 10^{-5}$ mL/m²/Pa/hr. The lower limit of the water permeability is not particularly limited, but it is practically 2.0 mL/m²/Pa/hr or more.

An average mass molecular weight of a polymer composing the functional composite membrane according to the present invention is hundreds of thousands or more because three-dimensional crosslinking is formed, and cannot be substantially measured. In general, the molecular weight is regarded to be infinite.

Next, each of the components of composition for forming the functional polymer membrane of the present invention will be described.

The composition for forming the functional polymer membrane of the present invention contains a polymerizable compound (A), and a copolymerizable monomer (B) as an essential component; and further contains a solvent (C), a polymerization initiator (D), a polymerization inhibitor (E), alkali metal compound (F) and the like as necessary. The functional polymer membrane of the present invention is formed by allowing the reaction of curing this composition.

Each component contained in the composition (hereinafter, also referred to as "composition of the present invention) for forming the functional polymer membrane according to the present invention will be described below.

Polymerizable Compound (A)

The functional polymer membrane of the present invention is formed by allowing the reaction of curing of the composition containing the polymerizable compound according to the present invention. The polymerizable compound has at least one ethylenically unsaturated group in a molecule, and preferably is water-soluble. In addition, the term "being water-soluble" means that at least 10 parts by mass, preferably, at least 30 parts by mass, and further preferably, at least 50 parts by mass are dissolved into 100 parts by mass of distilled water at 25° C.

Examples of such a polymerizable compound include a (meth)acrylate compound, a (meth)acrylamide compound, a vinyl ether compound, an aromatic vinyl compound, a N-vinyl compound (a polymerizable monomer having an amide bond), and an allyl compound. Above all, a (meth)acrylate compound and a (meth)acrylamide compound are preferred, and a (meth)acrylamide compound having two or more acrylamide groups and/or methacrylamide groups is more preferred.

Among these compounds, the polymerizable compound (A) preferably has two or more ethylenically unsaturated groups, and is preferably a crosslinkable monomer that can take crosslinked structure by the groups, particularly preferably, a compound represented by Formula (1) or Formula (MA), and most preferably, a compound represented by Formula (1). Such polymerizable compound has a high capability of polymerization and curing and is excellent in pH tolerance and mechanical characteristic. Further such polymerizable compound is easily polymerized by giving an active energy ray such as α-rays, γ-rays. X-rays, ultraviolet rays, visible light, infrared light or an electron beam, or energy such as heat, and thus a polymer membrane can be obtained.

Hereinafter, the compound represented by Formula (1) is described below.

group contains an alkylene group, at least one selected from —O—, —S— and —N(Ra)- may be further contained in the alkylene group. Herein, Ra represents a hydrogen atom or an alkyl group having 1 to 4 carbon atoms.

In addition, an expression "—O— is contained in the alkylene groups" means that the alkylene groups in a linking chain of the linking group are linked through the above-described hetero atom, such as -alkylene-O-alkylene-.

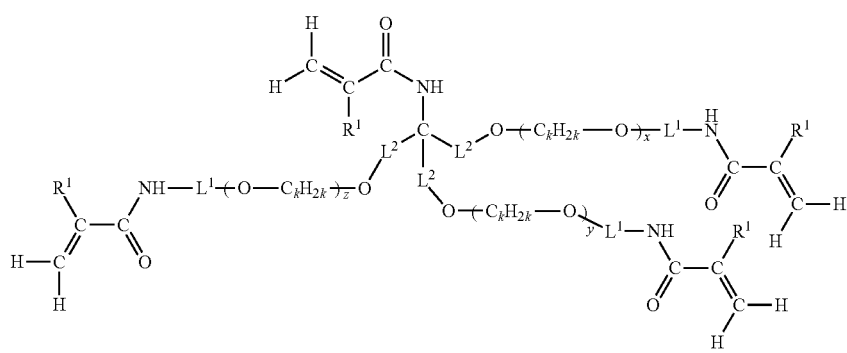

Formula (1)

In Formula (1), $R^1$ represents a hydrogen atom or a methyl group. $L^1$ represents a linear or branched alkylene group having 2 to 4 carbon atoms. However, in $L^1$, the oxygen atoms and nitrogen atoms bonded to both ends of $L^1$ do not have a structure which is bonded to the same carbon atom of $L^1$, $L^2$ represents a divalent linking group. k represents 2 or 3. x, y and z each independently represent an integer of from 0 to 6; and (x+y+z) satisfies from 0 to 18.

In Formula (1), plural $R^1$'s may be the same as or different from each other. $R^1$ is preferably a hydrogen atom.

In Formula (1), plural L's may be the same as or different from each other. The number of carbon atoms of the alkylene group of $L^1$ is preferably 3 or 4, more preferably 3. Of these, a linear alkylene group having 3 carbon atoms is particularly preferable. The alkylene group of $L^1$ may further have a substituent. Examples of the substituent include an alkyl group (preferably a methyl group), an aryl group, and an alkoxy group.

However, in $L^1$, the oxygen atoms and nitrogen atoms bonded to both ends of the $L^1$ do not have a structure which is bonded to the same carbon atom of $L^1$. $L^1$ is a linear or branched alkylene group linking the oxygen atom and the nitrogen atom of the (meth)acrylamide group. Herein, in a case where the alkylene group has a branched structure, it is considered that the oxygen atom and the nitrogen atom of the (meth)acrylamide group at both ends bond to the same carbon atom in the alkylene group, and take the —O—C—N— structure (hemiaminal structure). However, the polymerizable compound represented by Formula (1) for use in the present invention does not include a compound of such a structure. When the compound has the —O—C—N— structure in the molecule, degradation easily occurs at the position of the carbon atom. In particular, such a compound is easily decomposed during storage, and the decomposition is accelerated in the presence of water or moisture to reduce storage stability of the composition of the present invention.

In Formula (1), examples of the divalent linking group represented by $L^2$ include an alkylene group, an arylene group, a divalent heterocyclic group, and a group formed of a combination of these. Of these, an alkylene group is preferable. Herein, in a case where the divalent linking Specific examples of the alkylene group containing —O— include —$C_2H_4$—O—$C_2H_4$—, and —$C_3H_6$—O—$C_3H_6$—.

In Formula (1), when $L^2$ contains an alkylene group, examples of the alkylene group include methylene, ethylene, propylene, butylene, pentylene, hexylene, heptylene, octylene, and nonylene. The number of carbon atoms of the alkylene group of $L^2$ is preferably 1 to 6, further preferably 1 to 3, and particularly preferably 1. This alkylene group may further have a substituent. Examples of the substituent include an alkyl group (preferably a methyl group), an aryl group, and an alkoxy group.

In Formula (1), when $L^2$ contains an arylene group, examples of the arylene group include phenylene and naphthylene. The number of carbon atoms of the arylene group is preferably 6 to 14, further preferably 6 to 10, and particularly preferably 6. This arylene group may further have a substituent. Examples of the substituent include an alkyl group, and an alkoxy group.

In Formula (1), when $L^2$ contains a divalent heterocyclic group, this heterocyclic group is preferably a 5-membered or 6-membered ring, and may be condensed. In addition, the ring may be an aromatic heterocycle or a non-aromatic heterocycle. Examples of the heterocycle of the divalent heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among them, an aromatic heterocycle is preferable; and pyridine, pyrazine, pyrimidine, pyridazine, triazine, pyrazole, imidazole, benzimidazole, triazole, thiazole, benzothiazole, isothiazole, benzisothiazole, and thiadiazole is preferable.

In Formula (1), positions of two bonding hands of the heterocycle of the divalent heterocyclic group are not particularly limited. For example, for pyridine, substitution can be made in 2-position, 3-position and 4-position, and the two bonding hands may as well be in any position.

The heterocycle of the divalent heterocyclic group may have further a substituent. Examples of the substituent include an alkyl group, an aryl group, and alkoxy group.

In Formula (1), k represents 2 or 3. Plural k's may be the same as or different from each other. In addition, $C_kH_{2k}$ may be a linear structure or a branched structure.

In Formula (1), x, y and z each independently represent an integer of from 0 to 6, preferably an integer of from 0 to 5, and more preferably an integer of from 0 to 3. (x+y+z) satisfies from 0 to 18, preferably satisfies from 0 to 15, and more preferably satisfies from 0 to 9.

Examples of the polymerizable compound represented by Formula (1) are described below. However, the present invention is not limited thereto.

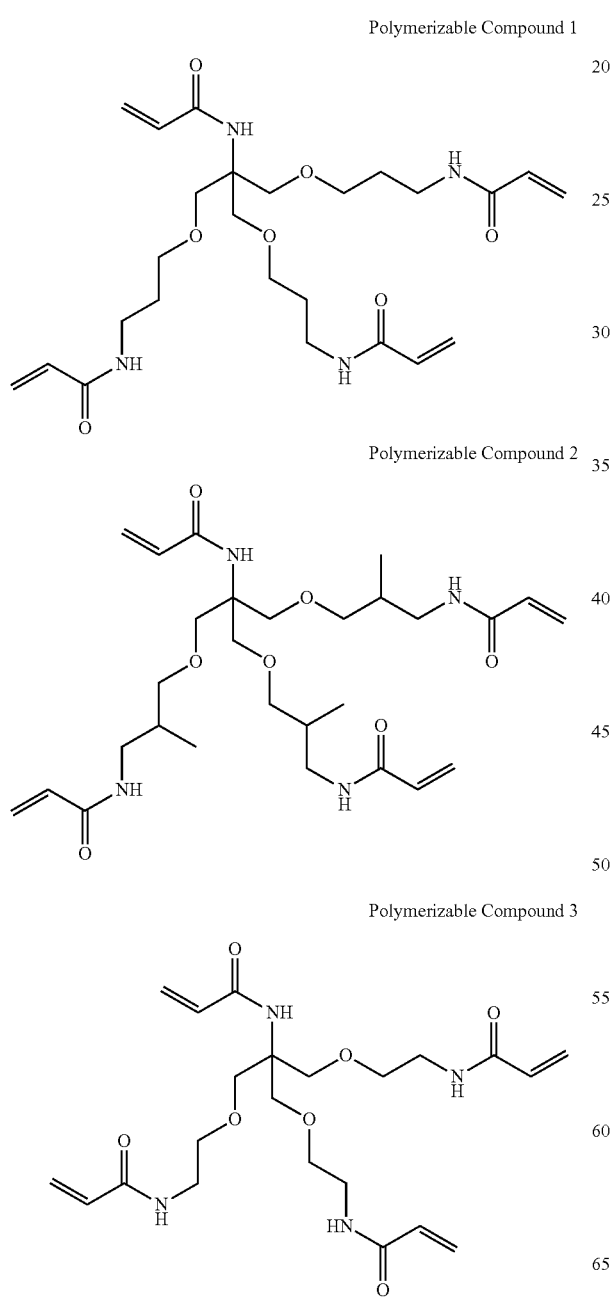

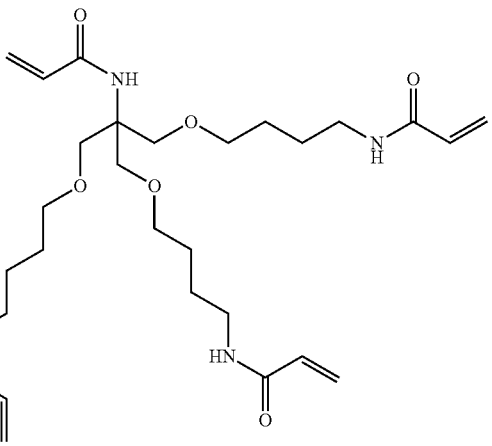

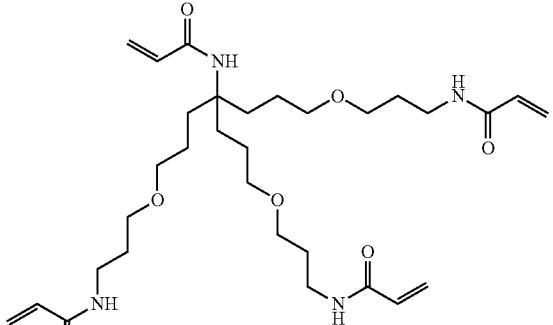

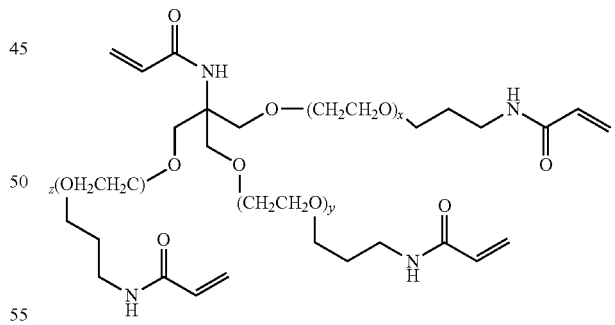

$x + y + z = 9$

The polymerizable compound represented by Formula (1) can be prepared according to, for example, the following scheme 1 or scheme 2. In the functional polymer membrane of the present invention, the compound represented by Formula (1) may be used in combination of two or more kinds thereof. Moreover, the compound represented by Formula (1) may be used in combination with a compound represented by Formula (MA) as described later.

Scheme 1

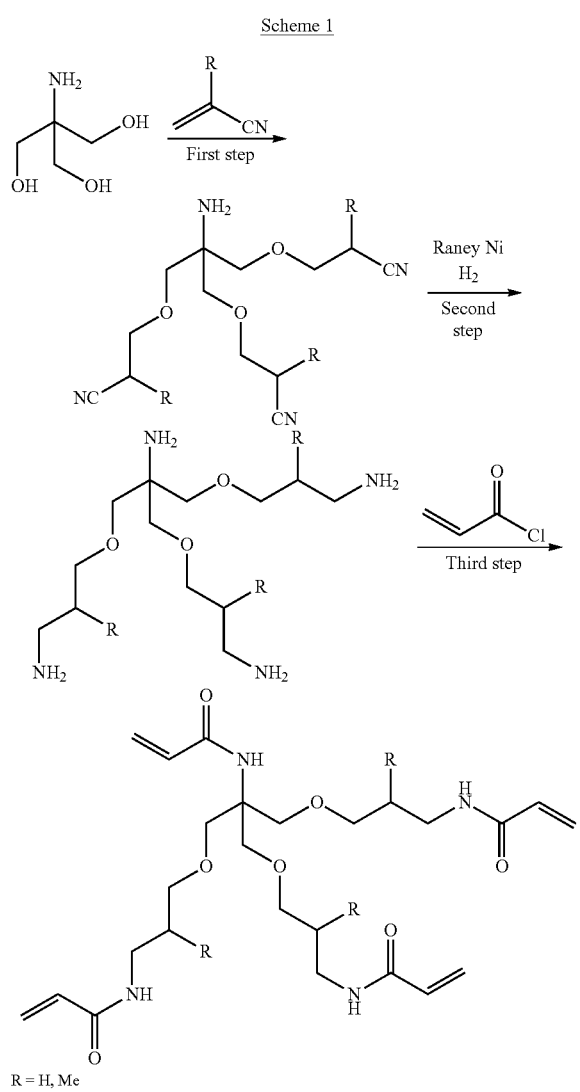

R = H, Me

Scheme 2

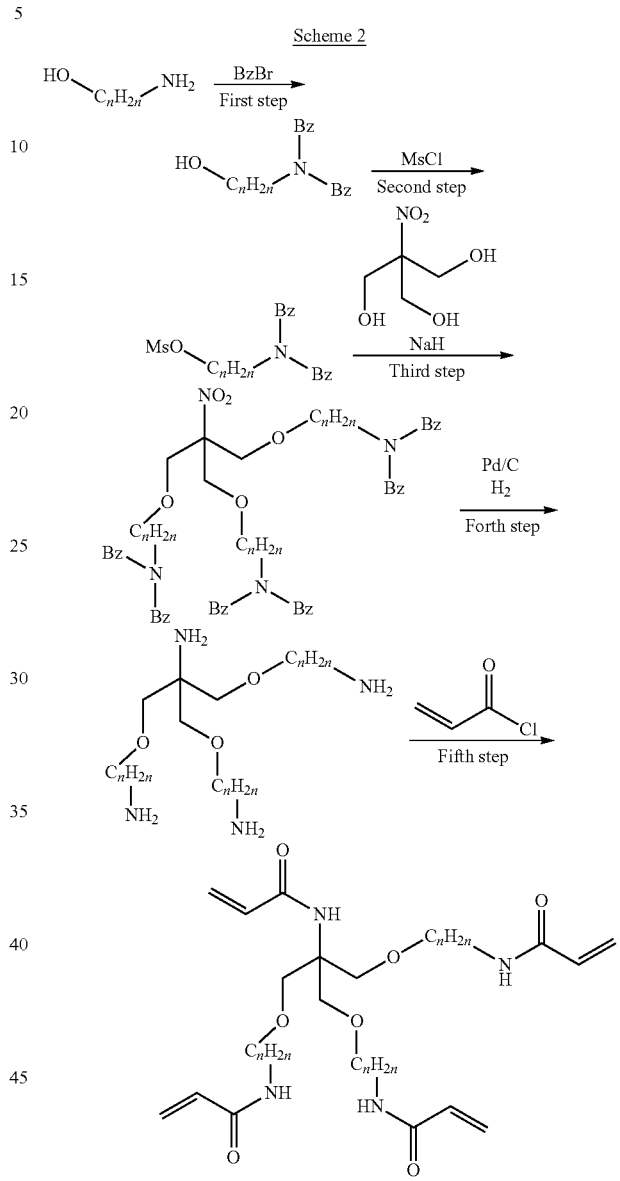

Herein, "Bz" represents a benzyl group, and "Ms" represents a methanesulfonyl group.

methacrylic acid chloride, it is possible to obtain a compound having an acrylamide group and methacrylamide group in the same molecule as the final product.

[Scheme 1]
(First Step)

The first step is a step of obtaining a polycyano compound by a reaction of acrylonitrile and trishydroxymethylaminomethane.

The reaction in this step is preferably carried out at the temperature of 3 to 60° C. for 2 to 8 hours.

(Second Step)

The second step is a step of reacting the polycyano compound with hydrogen in the presence of a catalyst and obtaining a polyamine compound by a reduction reaction.

The reaction in this step is preferably carried out at the temperature of 20 to 60° C. for 5 to 16 hours.

(Third Step)

The third step is a step of obtaining a polyfunctional acrylamide compound by an acylating reaction of the polyamine compound, and acrylic acid chloride or methacrylic acid chloride.

The reaction in this step is preferably carried out at the temperature of 3 to 25° C. for 1 to 5 hours. Herein, instead of acrylic acid chloride, the acylating agent may use diacrylate anhydride or dimethacrylic anyhydride. Herein, in the acylation step, by using both acrylic acid chloride and

[Scheme 2]
(First Step)

The first step is a step of obtaining a nitrogen-protected amino alcohol compound by a protective group introduction reaction according to a benzyl group, a benzyloxycarbonyl group or the like in a nitrogen atom of an amino alcohol.

The reaction in this step is preferably carried out at the temperature of 3 to 25° C. for 3 to 5 hours.

(Second Step)

The second step is a step of introducing a leaving group such as a methanesulfonyl group (described in the above-described scheme 2, as a representative) and a p-toluenesulfonyl group into an OH group of the nitrogen-protected amino alcohol compound to obtain a sulfonyl compound The reaction in this step is preferably carried out at the temperature of 3 to 25° C. for 2 to 5 hours.

(Third Step)

The third step is a step of obtaining an amino alcohol adduct compound by an $S_N2$ reaction of the sulfonyl compound and tris hydroxymethyl nitro methane.

The reaction in this step is preferably carried out at the temperature of 3 to 70° C. for 5 to 10 hours.

(Forth Step)

The forth step is a step of reacting the amino alcohol adduct compound with hydrogen in the presence of a catalyst and obtaining a polyamine compound by a hydrogenation reaction.

The reaction in this step is preferably carried out at the temperature of 20 to 60° C. for 5 to 16 hours.

(Fifth Step)

The fifth step is a step of obtaining a polyfunctional acrylamide compound by an acylating reaction of the polyamine compound, and acrylic acid chloride or methacrylic acid chloride.

The reaction in this step is preferably carried out at the temperature of 3 to 25° C. for 1 to 5 hours. Herein, instead of (meth)acrylic acid chloride, the acylating agent may use diacrylate anhydride or dimethacrylic anhydride. Herein, in the acylation step, by using both acrylic acid chloride and methacrylic acid chloride, it is possible to obtain a compound having an acrylamide group and methacrylamide group in the same molecule as the final product.

The compound obtained through the above-described steps can be obtained by purification of the reaction product solution by a usual method. For example, it is possible to perform purification by liquid separation and extraction using an organic solvent, crystallization using a poor solvent, column chromatography using silica gel, or the like.

Next, the compound represented by Formula (MA) is described below.

Formula (MA)

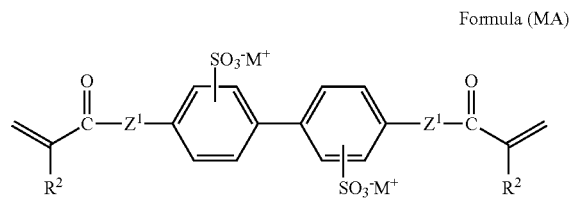

In Formula (MA), $R^2$ represents a hydrogen atom or an alkyl group, and Z represents —O— or —NRb-. Herein, Rb represents a hydrogen atom or an alkyl group. $M^+$ represents a hydrogen ion or an alkali metal ion.

The alkyl group of $R^2$ is a linear or branched alkyl group. The number of carbon atoms of the alkyl group is preferably from 1 to 10, more preferably from 1 to 5, and particularly preferably from 1 to 3. Specific examples of the alkyl group include methyl, ethyl, iso-propyl, tert-butyl, n-octyl, 2-ethylhexyl, n-decyl, and n-hexadecyl. $R^2$ is preferably a hydrogen atom or a methyl group, and more preferably a hydrogen atom.

$Z^1$ represents —O— or —NRb-, preferably —NRb-.

Herein, Rb represents a hydrogen atom or an alkyl group. The alkyl group is a linear or branched alkyl group. The number of carbon atoms of the alkyl group is preferably from 1 to 10, more preferably from 1 to 5, and particularly preferably from 1 to 3. Specific examples of the alkyl group include methyl, ethyl, iso-propyl, tert-butyl, n-octyl, 2-ethylhexyl, n-decyl, and n-hexadecyl.

Rb is preferably a hydrogen atom, a methyl group, or an ethyl group; more preferably a hydrogen atom.

$M^+$ represents a hydrogen ion or an alkali metal ion. Preferred examples of the alkali metal ion include lithium ion, a potassium ion, and a sodium ion.

$M^+$ is preferably a hydrogen ion, a lithium ion, a potassium ion, or a sodium ion; more preferably a hydrogen ion, or a sodium ion; and further preferably a sodium ion.

If the ratio is in the above-described preferred range, the composition is excellent in desired curing properties, the pH tolerance, the mechanical strength and soft properties.

Examples of the compound represented by Formula (MA) are described below. However, the present invention is not limited thereto.

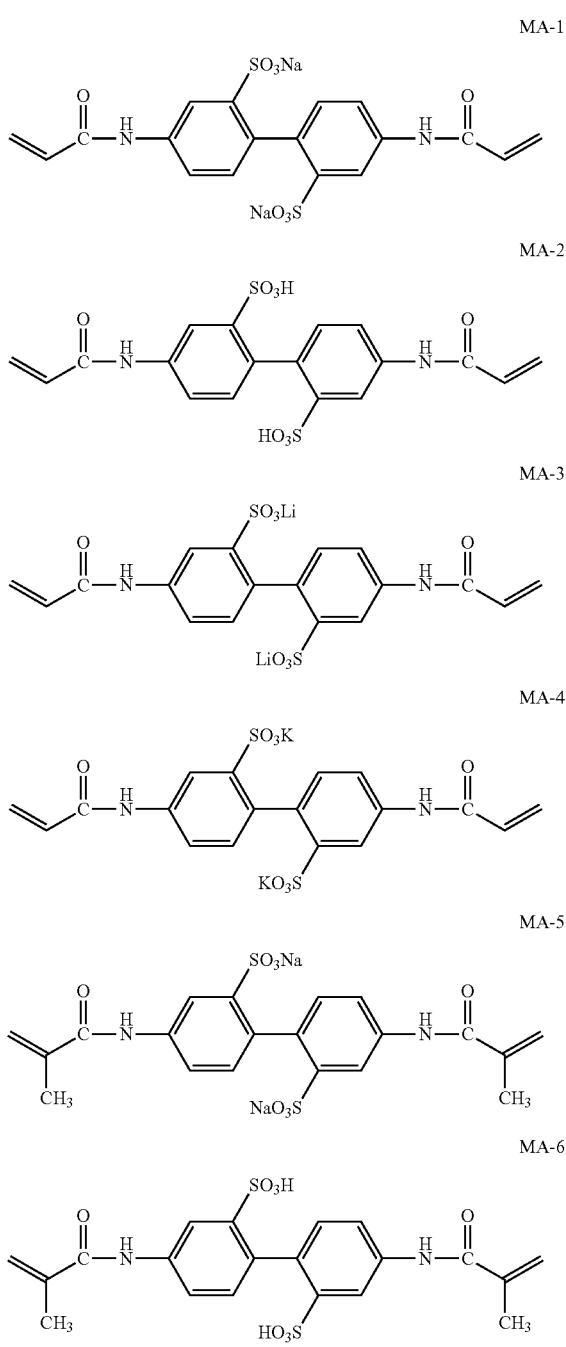

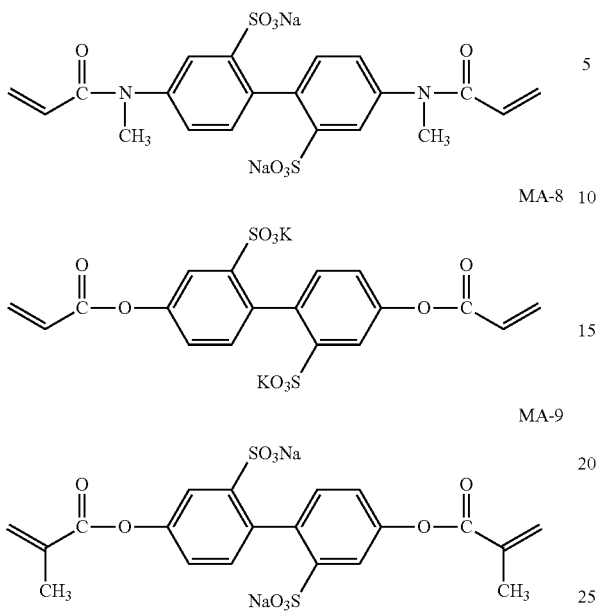

These compounds can be synthesized by a method presented in Examples described later or a method according thereto.

The solid content of the above-described polymerizable compound (A) is preferably 10 to 85 parts by mass, and further preferably, 20 to 85 parts by mass, based on 100 parts by mass of the total solid in the composition for forming the membrane.

On the other hand, the content of the above-described polymerizable compound (A) is preferably 5 to 60 parts by mass, and further preferably, 10 to 55 parts by mass, based on 100 parts by mass of the composition for forming the membrane, including the solvent.

Copolymerizable Monomer (B)

The functional polymer membrane of the present invention can be obtained by allowing the reaction of curing of the above-described polymerizable compound (A) and the above-described copolymerizable monomer (B), more specifically, a polymerization reaction therebetween.

Such a copolymerizable monomer is preferably a monofunctional polymerizable compound. Examples thereof include a (meth)acrylate compound, a (meth)acrylamide compound, a vinyl ether compound, an aromatic vinyl compound, an N-vinyl compound (a polymerizable monomer having an amide bond), and an allyl compound.

In view of stability and the pH tolerance of the resultant functional polymer membrane, these compounds preferably include one having no ester bond, a (meth)acrylamide compound, a vinyl ether compound, an aromatic vinyl compound, an N-vinyl compound (a polymerizable monomer having an amide bond), or an allyl compound, and particularly preferably, a (meth)acrylamide compound.

Examples of the copolymerizable monomer include compounds described in JP-A-2008-208190 ("JP-A" means unexamined published Japanese patent application) and JP-A-2008-266561.

These copolymerizable monomers preferably have a dissociative group, as described later, for giving a function of the polymer membrane.

As the copolymerizable monomer having a (meth)acrylamide structure used in the present invention, a compound represented by Formula (2) is preferable.

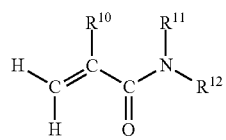

Formula (2)

In Formula (2), $R^{10}$ represents a hydrogen atom or a methyl group. $R^{11}$ represents a hydrogen atom, or a substituted or unsubstituted alkyl group. $R^{12}$ represents a substituted or unsubstituted alkyl group. Herein, the alkyl groups of $R^{11}$ and $R^{12}$ each may be a linear or a branched alkyl group, or may be bonded to each other to form a ring.

$R^{10}$ is preferably a hydrogen atom.

Examples of the alkyl group of $R^{11}$ and $R^{12}$ include methyl, ethyl, n-propyl, iso-propyl, n-butyl, t-butyl, n-pentyl, n-hexyl, n-octyl, t-octyl, n-decyl, and n-octadecyl. The number of carbon atoms of the alkyl group is preferably from 1 to 18, more preferably from 1 to 12, and further preferably from 1 to 6.

These alkyl groups each are preferably a linear or branched alkyl group, and may further have a substituent. Examples of the substituent of the alkyl group include an alkyl group, an aryl group, an alkoxy group, an aryloxy group, an acyl group, a halogen atom, a heterocyclic group, an alkylthio group, an arylthio group, an amino group (including an amino group, an alkylamino group, an arylamino group and a heterocyclic amino group), an amide group, a sulfonamide group, a carbamoyl group, a sulfamoyl group, a cyano group, a sulfo group or a salt thereof, a carboxy group or a salt thereof, a phosphoric acid or a salt thereof, and an onio group (e.g. an ammonio group, a sulfonio group, and a pyridinio group). In the cation exchange membrane, specific examples include a hydroxy group, a sulfo group or a salt thereof, and a carboxy group or a salt thereof.

In the present invention, in particular, in order to give the function of the polymer membrane, the function is preferably given by a substituent of this alkyl group. Therefore, among the above-described substituents a dissociative group or a polar substituent is preferable, and a dissociative group is particularly preferable.

The dissociative group is preferably a hydroxyl group (in particular, a phenolic or enolic hydroxyl group), a sulfo group or a salt thereof, a carboxy group or a salt thereof, or an onio group (e.g. an ammonio group, a pyridinio group and, a sulfonio group), each of which is exemplified in the above; and more preferably a sulfo group or a salt thereof, a carboxy group or a salt thereof, or an onio group.

In the cation exchange membrane, the dissociative group is preferably a hydroxyl group (in particular, a phenolic or enolic hydroxyl group), a sulfo group or a salt thereof, a carboxy group or a salt thereof, or a phosphoric acid or a salt thereof; and more preferably a sulfo group or a salt thereof, or a carboxy group or a salt thereof.

Herein, the salt in the sulfo group or the carboxy group preferably includes a cation of an alkali metal atom, such as a lithium ion, a potassium ion or a sodium ion.

In the anion exchange membrane, the dissociative group is preferably an onio group, and more preferably a group represented by Formula (a) or (b).

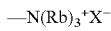  Formula (a)

  Formula (b)

In Formulas (a) and (b). Rb represents an alkyl group or an aryl group. Plural Rb's may be the same as or different from each other, or two Rb's may be bonded to each other to form a ring.

$X^-$ represents a negative ion.

The alkyl group of Rb has preferably 1 to 18 carbon atoms, more preferably 1 to 12 carbon atoms, and further preferably 1 to 6 carbon atoms. The alkyl group may have a substituent. Specific examples of such a substituent include a substituent that the alkyl group in $R^{11}$ and $R^{12}$ may have. Above all, the substituent preferably includes an aryl group. The alkyl group in which the aryl group in Rb is substituted preferably includes a benzyl group.

The aryl group of Rb has preferably 6 to 18 carbon atoms, and more preferably 6 to 12.

The aryl group of Rb may have a substituent. Specific examples of such a substituent include a substituent that the alkyl group in $R^{11}$ and $R^{12}$ may have.

A ring formed by bonding of two of Rb with each other preferably includes a 5-membered ring or a 6-membered ring.

Such a ring preferably includes, in Formula (a), a nitrogen-containing aromatic ring, and above all, preferably, a pyridine ring.

Specific examples of anions of $X^-$ include a halogen ion, a carboxylic acid ion (for example, an acetic acid ion and a benzoic acid ion), a sulfuric acid ion, an organic sulfuric acid ion (a methanesulfonic acid ion, a benzenesulfonic acid ion and a p-toluenesulfonic acid ion) and OH.

Examples of the group represented by Formula (a) include trimethylammonio, triethylammonio, tributylammonio, dimethylbenzylammonio, dimethylphenylammonio, dimethylcetylammonio, and pyridinio.

Examples of the group represented by Formula (b) include dimethylsulfonio, methylbenzylsulfonio, and methylphenylsulfonio.

Among the group represented by Formula (a) or Formula (b), the group represented by Formula (a) is preferable.

The substituent that the alkyl group in $R^{11}$ and $R^{12}$ may have includes preferably a polar group, other than the above-descried dissociative group, preferably, an acyl group or an amino group, and particularly preferably, an amino group. The amino group preferably includes a tertiary amino group, and preferably, a group represented by Formula (c).

  Formula (c)

In Formula (c), Rb has the same meaning as Rb in Formula (a), and a preferable range thereof is also the same.

Examples of the group represented by Formula (c) include dimethylamino, and diethylamino.

Among the substituents that the alkyl group in $R^{11}$ and $R^{12}$ may have, the acyl group may include any of an alkylcarbonyl group and an arylcarbonyl group, but preferably includes an alkylcarbonyl group. The number of carbon atoms of the alkylcarbonyl group is preferably 2 to 12. The number of carbon atoms of the arylcarbonyl group is preferably 7 to 12. Examples of the acyl group include acetyl, propionyl, pivaloyl, and benzoyl.

When the alkyl group in $R^{11}$ and $R^{12}$ has a substituent, the number of carbon atoms in an alkyl group moiety is preferably 1 to 6, and preferably, 1 to 3.

A ring formed by bonding of $R^{11}$ and $R^{12}$ with each other may include any of a hydrocarbon ring or a hetero ring. In the case of the hetero ring, a ring constituting atom preferably includes an oxygen atom, a nitrogen atom or a sulfur atom.

The ring formed by bonding of $R^{11}$ and $R^{12}$ with each other preferably includes a 5-membered ring or a 6-membered ring.

Examples of these rings include a cyclopentane ring, a cyclohexane ring, a piperidine ring, a morpholine ring, a piperazine ring, a furan ring, a pyrrole ring, and a thiophene ring.

In Formula (2), $R^{11}$ is preferably a hydrogen atom. Moreover, $R^{12}$ is preferably an alkyl group, or an alkyl group substituted with a dissociative group or an onio group. Of these, an alkyl group substituted with a dissociative group and an alkyl group substituted with an onio group are preferred; —C(CH$_3$)$_2$CH$_2$-(a dissociative group), —C(CH$_3$)$_2$CH$_2$-(an onio group), —(CH$_2$)$_2$-(a dissociative group), —(CH$_2$)$_2$-(an onio group), —(CH$_2$)$_3$-(a dissociative group), and —(CH$_2$)$_3$-(an onio group) are preferred; —C(CH$_3$)$_2$CH$_2$-(a dissociative group) and —C(CH$_3$)$_2$CH$_2$-(an onio group) are more preferred.

As specific examples of the monofunctional polymerizable compound having a (meth)acrylamide structure represented by Formula (2) described above as the copolymerizable monomer, include the following exemplified compounds (B-1) to (B-23). However, the present invention is not limited thereto.

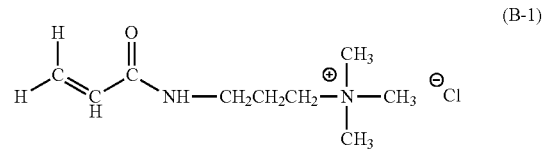
(B-1)

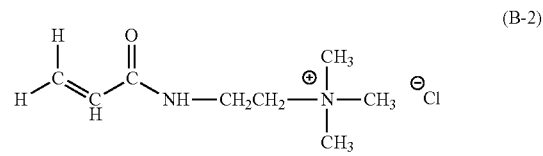
(B-2)

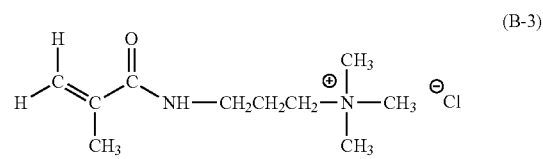
(B-3)

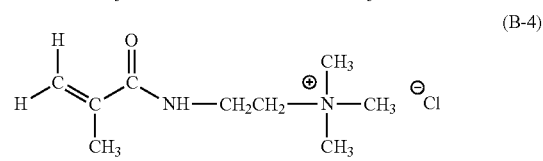
(B-4)

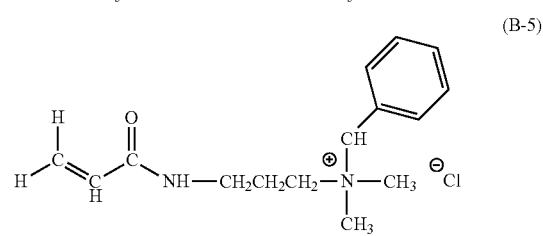
(B-5)

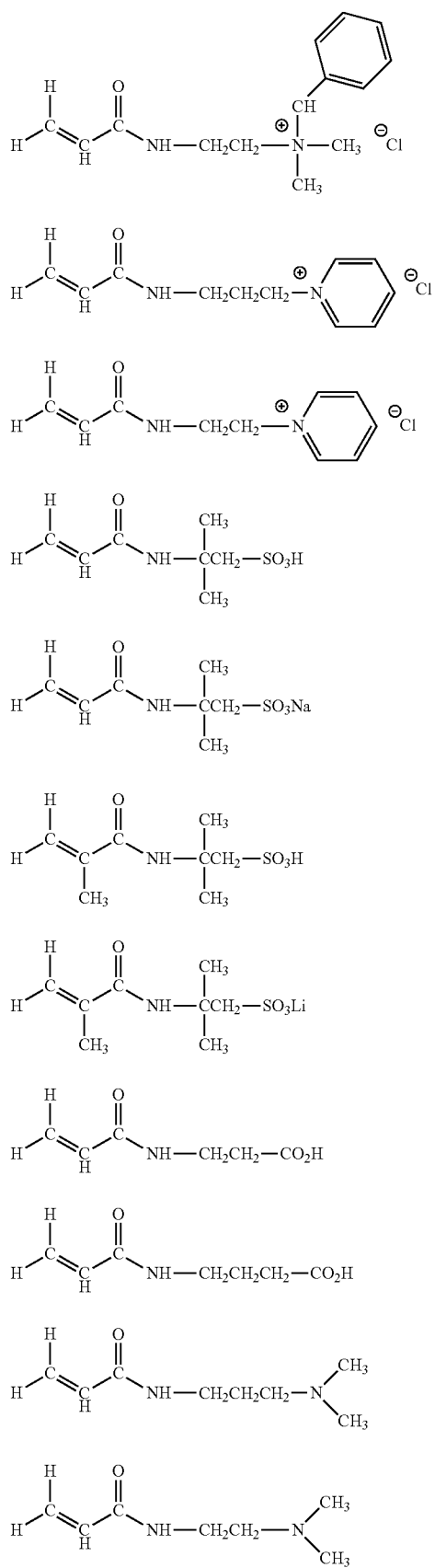
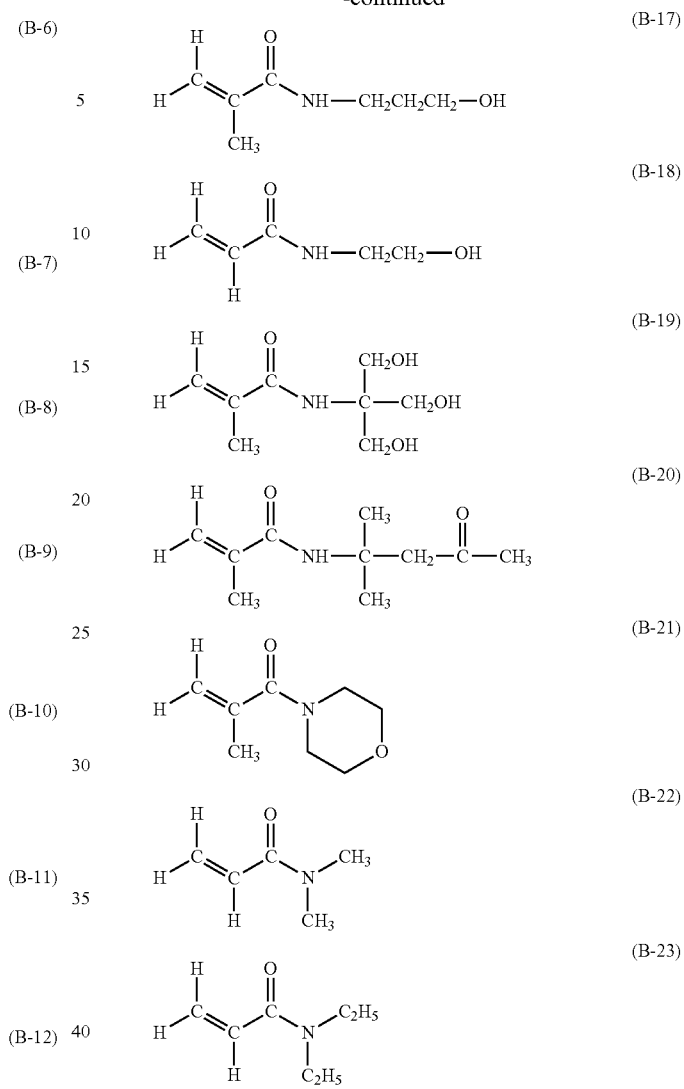

These compounds are available from Kohjin Co., Ltd, Kyowa Hakko Chemical Co., Ltd., Fluka Corporation, Sigma-Aldrich Corporation or Toagosei Co., Ltd., or can be easily synthesized by a publicly known method.

In the composition for forming the membrane according to the present invention, a mole ratio r of a content of the polymerizable compound (A) to a content of the copolymerizable monomer (B) is preferably $0.1 < r < 3.5$, further preferably, $0.1 < r < 1.0$, and particularly preferably, $0.15 < r < 0.5$.

The copolymerizable monomer (B) performs action such as adjustment of a balance between the water permeability of the functional polymer membrane according to the present invention and the electrical resistance of the membrane according to the present invention, or adjustment of viscosity of an application liquid formed of the composition or stability over time, or the like.

Solvent (C)

The composition for forming the membrane according to the present invention may contain a solvent (C).

In the present invention, a content of the solvent (C) in the above-described composition is preferably 1 to 35 parts by mass, and further preferably, 10 to 30 parts by mass, based on 100 parts by mass of the total composition.

Adjustment of the content of the solvent in this range allows production of a uniform membrane without a rise of viscosity of the composition. Moreover, occurrence of pinholes (minute defective holes) is suppressed.

The solvent (C) having a solubility to water in an amount of 5% by mass or more is preferably used, and one that is freely mixed with water is further preferred. Therefore, a solvent selected from water and a water-soluble solution is preferred. The water-soluble solution particularly preferably includes an alcohol-based solvent, an ether-based solvent being an aprotic polar solvent, an amide-based solvent, a ketone-based solvent, a sulfoxide-based solvent, a sulfone-based solvent, a nitrile-based solvent and an organic phosphorus-based solvent. Water and alcohol-based solvent are preferred. Examples of the alcohol-based solvents include methanol, ethanol, isopropanol, n-butanol, ethylene glycol, propylene glycol, diethylene glycol, and dipropylene glycol. Among the alcohol-based solvents, ethanol, isopropanol, n-butanol, and ethylene glycol are more preferable; and isopropanol is particularly preferable. These solvents can be used alone in one kind or in combination of two or more kinds. Use of water alone or water in combination with a water-soluble solvent is further preferred. In use of water in combination with a water-soluble solvent, isopropanal is used in an amount of, preferably, 0.1 to 10%, further preferably, 0.5 to 5%, and still further preferably, 1.0 to 2.0% based on 100% by mass of water.

Preferred specific examples of the aprotic polar solvents include dimethyl sulfoxide, dimethylimidazolidinone, sulfolane, N-methylpyrrolidone, dimethylformamide, acetonitrile, acetone, dioxane, tetramethyl urea, hexamethyl phosphoramide, pyridine, propionitrile, butanone, cyclohexanone, tetrahydrofuran, tetrahydropyran, ethyleneglycol diacetate and γ-butyrolactone. Among these, dimethylsulfoxide, N-methylpyrrolidone, dimethylformamide, dimethylimidazolidinone, sulfolane, acetone, acetonitrile and tetrahydrofuran are preferred. These solvents may be used alone or in combination of two or more kinds.

Photopolymerization Initiator (D)

The composition for forming the functional polymer membrane of the present invention preferably contains a polymerization initiator.

The polymerization initiators, in the present invention, preferably include a photopolymerization initiator that can allow polymerization by irradiation with energy rays.

Examples of a photopolymerization initiator include aromatic ketones, acylphosphine compounds, aromatic onium salt compounds, organic peroxides, thio compounds, hexaaryl biimidazole compounds, ketoxime ester compounds, borate compounds, azinium compounds, metallocene compounds, active ester compounds, compounds having a carbon-halogen bond, alkylamine compounds, and the like.

Preferable examples of the aromatic ketones, acylphosphine oxide compounds and thio compounds include compounds having a benzophenone skeleton or a thioxanthone skeleton described in "RADIATION CURING IN POLYMER SCIENCE AND TECHNOLOGY", pp. 77 to 117 (1993), and the like. More preferable examples may include α-thiobenzophenone compounds described in JP-B-47-6416 ("JP-B" means examined Japanese patent publication); benzoin ether compounds described in JP-B-47-3981; α-substituted benzoin compounds described in JP-B-47-22326; benzoin derivatives described in JP-B-47-23664; aroyl phosphonate esters described in JP-A-57-30704; dialkoxybenzophenone described in JP-B-60-26483; benzoin ethers described in JP-B-60-26403 and JP-A-62-81345; α-aminobenzophenones described in JP-B-1-34242, U.S. Pat. No. 4,318,791, and European Patent No. 0284561A1; p-di(dimethylaminobenzoyl)benzene described in JP-A-2-211452; thio-substituted aromatic ketones described in JP-A-61-194062; acylphosphine sulfide described in JP-B-2-9597; acylphosphine described in JP-B-2-9596; thioxanthones described in JP-B-63-61950; coumarins described in JP-B-59-42864, and the like. Further, polymerization initiators described in JP-A-2008-105379 and JP-A-2009-114290 are also preferable. Further, specific examples of the polymerization initiator may include polymerization initiators as described in pp. 65 to 148 of "System of curing by ultraviolet rays" by Kiyoshi Kato (published by SOGO GIJYUTSU CENTER Corporation, 1989).

In the present invention, the polymerization initiator is preferably a water soluble polymerization initiator.

Note that, the term "water soluble" used in the polymerization initiator means that the initiator is dissolved in distilled water at 25° C. in an amount of 0.1 mass % or more. The water soluble polymerization initiator is further preferably dissolved in distilled water at 25° C. in an amount of 0.5 mass % or more, and particularly preferably 1 mass % or more.

Among those, a photopolymerization initiator which is suitable for the ink composition of the present invention is aromatic ketones (in particular, α-hydroxy-substituted benzoin compound) or an acylphosphineoxide compound. Particularly, p-phenyl benzophenone (manufactured by Wako Pure Chemical Industries, Ltd.), bis(2,4,6-trimethylbenzoyl) phenylphosphine oxide (Irgacure 819, manufactured by BASF Japan Ltd.), 2,4,6-trimethylbenzoyl diphenylphosphine oxide (Darocur TPO, manufactured by BASF Japan Ltd.), 2-benzyl-2-dimethylamino-1-(4-morpholinophenyl)-butanone-1 (Irgacure 369, manufactured by BASF Japan Ltd.), 2-methyl-1-(4-methylthiophenyl)-2-morpholinopropan-1-one (Irgacure 907, manufactured by BASF Japan Ltd.), 1-[4-(2-hydroxyethoxy)-phenyl]-2-hydroxy-2-methyl-1-propane-1-one (Irgacure 2959, manufactured by BASF Japan Ltd.), and 2-hydroxy-2-methyl-1-phenyl-propane-1-one (Darocur 1173, manufactured by Ciba Specialty Chemicals Inc.) are preferable; and Irgacure 2959 (manufactured by BASF Japan Ltd.) and Darocur 1173 (manufactured by Ciba Specialty Chemicals Inc.) are most preferable, from the viewpoint of water-soluble and hydrolysis-resistance.

In the present invention, a content of the polymerization initiator is preferably 0.1 to 10 parts by mass, further preferably, 0.1 to 5 parts by mass, and still further preferably, 0.3 to 2 parts by mass, based on 100 parts by mass of the total solid mass in the composition.

Polymerization Inhibitor (E)

In order to provide the application liquid with stability upon forming the functional polymer membrane, the composition for forming the functional polymer membrane according to the present invention preferably contains also a polymerization inhibitor.

As the polymerization inhibitor, known polymerization inhibitors can be used. Examples thereof include a phenol compound, a hydroquinone compound, an amine compound, and a mercapto compound.

Specific examples of the phenol compound include hindered phenol (phenol having a t-butyl group in an ortho position, and typified by 2,6-di-t-butyl-4-methylphenol) and bisphenol. Examples of the hydroquinone compound include monomethylether hydroquinone. Examples of the amine compound include N-nitroso-N-phenyl hydroxylamine, and N,N-diethylhydroxylamine.

These polymerization inhibitors may be used alone in one kind or in combination with two or more kinds.

A content of the polymerization inhibitor is preferably 0.01 to 5 parts by mass, further preferably, 0.01 to 1 part by mass, and still further preferably, 0.01 to 0.5 part by mass, based on 100 parts by mass of the total solid content in the composition.

Alkali Metal Compound (F)

The composition of the present invention may contain an alkali metal compound (F) in order to improve solubility of the above-described compound having (meth)acrylamide structure. The alkali metal compound preferably includes a hydroxide salt of lithium, sodium or potassium, a chloride salt thereof and a nitrate salt thereof. Above all, a lithium compound is further preferred and specific examples thereof include lithium hydroxide, lithium chloride, lithium bromide, lithium nitrate, lithium iodide, lithium chlorate salt, lithium thiocyanate, lithium perchlorate, lithium tetrafluoroborate, lithium hexafluorophosphate and lithium hexafluoroarsenate.

Herein, the alkali metal compound is also preferably used in order to neutralize the composition or a composition solution mixture.

These alkali metal compounds may be hydrate. Moreover, these compounds can be used alone in one kind or in combination with two or more kinds.

An amount of addition when the alkali metal compound is added is preferably 0.1 to 20 parts by mass, further preferably, 1 to 20 parts by mass, still further preferably, 5 to 20 parts by mass, and particularly preferably, 5 to 15 parts by mass, based on 100 parts by mass of the total solid content in the composition.

[Other Components and the Like]

[Surfactant]

The composition for forming the functional polymer membrane of the present invention may contain a variety of polymer compounds in order to adjust membrane physical properties. Examples of the polymer compounds include acrylic polymers, polyurethane resins, polyamide resins, polyester resins, epoxy resins, phenol resins, polycarbonate resins, polyvinyl butyral resins, polyvinyl formal resins, shelac, vinylic resins, acrylic resins, rubber-based resins, waxes, and other natural resins. These polymer compounds may be used alone or in combination of two or more kinds thereof.

Moreover, a nonionic surfactant, a cationic surfactant, an organic fluoro surfactant or the like may be added in order to adjust liquid physical properties.

Specific examples of the surfactant include anionic surfactants such as alkylbenzene sulfonates, alkyl naphthalene sulfonates, higher fatty acid salts, sulfonates of a higher fatty acid ester, ester sulfates of a higher alcohol ether, sulfonates of a higher alcohol ether, alkylcarboxylates of a higher alkylsulfone amide, and alkylphosphates; and nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxycthylcne sorbitan fatty acid esters. Other examples include amphoteric surfactants such as alkyl betaine or amide betaine, silicone-based surfactants, fluorine-based surfactants and the like. The surfactant may be suitably selected from conventionally known surfactants and derivatives thereof.

[Polymer Dispersant]

The composition for forming the membrane of the present invention may contain a polymer dispersant.

Specific examples of the polymer dispersant include polyvinyl pyrrolidone, polyvinyl alcohol, polyvinyl methylether, polyethylene oxide, polyethylene glycol, polypropylene glycol, and polyacryl amide. Among them, polyvinyl pyrrolidone is preferably used.

[Crater Preventive]

A crater preventative is also referred to as a surface conditioner, a levelling agent or a slipping agent to prevent irregularity on a membrane surface, and specific examples include organomodified polysiloxane (mixture of polyether siloxane and polyether), a polyether-modified polysiloxane copolymer and a silicon-modified copolymer.

Specific examples of commercial items include Tego Glide 432, Tego Glide 110, Tego Glide 110, Tego Glide 130, Tego Glide 406, Tego Glide 410, Tego Glide 411, Tego Glide 415, Tego Glide 420, Tego Glide 435, Tego Glide 440. Tego Glide 450. Tego Glide 482, Tego Glide A115, Tego Glide B1484, and Tego Glide ZG400 (all; trade names), manufactured by Evonik industries GmbH.

The crater preventive is added in an amount of, preferably 0 to 10 parts by mass, further preferably, 0 to 5 parts by mass, and still further preferably, 1 to 2 parts by mass, based on 100 parts by mass of the total solid content in the composition.

In addition to the above, the composition for forming the membrane according to the present invention may contain, when necessary, a viscosity improver or a preservative, for example.

<Support>

The functional polymer membrane of the present invention may as well include a membrane alone, but preferably has a support as a reinforcing material in order to improve mechanical strength. The support preferably includes a porous support. This porous support can be formed as part of the membrane by applying and/or impregnating the composition of the present invention, and then allowing the curing reaction.

Specific examples of the porous support as the reinforcing material include a synthetic woven fabric or non-woven fabric, a sponge-like film, and a film having microscopic through-holes. Examples of the material for forming the porous support used in the present invention include polyolefin (e.g. polyethylene, and polypropylene), polyacrylonitrile, polyvinyl chloride, polyester, polyamide, and copolymers thereof; or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl-1-pentene), polyinylidene fluoride, polytetrafluoroethylene, polyhexafluoropropylene, polychlorotrifluoroethylene, and copolymers thereof. Of these, the polyolefin is preferable in the present invention.

Commercially available porous supports and reinforcing materials are marketed from Japan Vilene Company. Ltd., Freudenberg Filtration Technologies SE & Co. KG (Novatexx material), and Sefar AG, for example.

When the composition of the present invention is incorporated into the support being the porous reinforcing material by application or impregnation before curing, the support being the porous reinforcing material to be used preferably includes a support of a raw material that absorbs no irradiation wavelength of the energy rays used for curing.

Moreover, the composition of the present invention can preferably penetrate into pores of the support of the porous reinforcing material.

The porous support preferably has hydrophilicity. Therefore, the support to be used is preferably subjected to treatment such as corona discharge treatment, ozone treatment, sulfuric acid treatment and silane coupling agent treatment.

[Method of Producing Functional Polymer Membrane]

Next, the method of producing a functional polymer membrane according to the present invention will be described.

The method of producing a functional polymer membrane according to the present invention includes a production method in which the composition containing the polymerizable compound (A) and the monofunctional polymerizable compound being the copolymerization monomer (B) is subjected to the curing reaction to adjust the pore volume fraction in an amount of 0.6% or more and 3.0% or less.

The above-described composition preferably contains the solvent (C) therein, and the content of the solvent is preferably 1 to 35 parts by mass based on 100 parts by mass of the total mass of the composition.

Moreover, the above-described solvent (C) preferably is water or a water-soluble solvent, and the above-described composition is applied and/or impregnated into the support, and then preferably subjected to the curing reaction. Further, the above-described curing reaction preferably includes a curing reaction in which the above-described composition is polymerized by irradiation with the energy rays.

The method of producing a functional polymer membrane according to the present invention will be described in detail below.

Upon producing the functional polymer membrane in the present invention, the support or a temporary support (a support simply for applying the composition of the present invention to form the membrane, and the support being peeled therefrom after the membrane is formed. The support and the temporary support are hereinafter collectively referred to as the support) is preferably used.

When the composition of the present invention is coated by application, impregnation or the like into the support, the membrane can be prepared in a batch process using an immobilized support, but can be also prepared in a continuous process using a moving support. The support may have a roll shape to be continuously rewound. When the membrane is prepared in the continuous process, the support is placed on a continuously moving belt to allow preparation of the membrane (or a combination of these methods). If such a method is applied, the above-described composition of the present invention can be coated onto the support in the continuous process, or can be coated in a large-scale batch process.

When the support used for reinforcing the mechanical strength, particularly, the porous support is used, the temporary support may be used. In this case, if the composition of the present invention is soaked into the porous support, and the curing reaction is terminated, only the temporary support is peeled from the membrane.

In such a temporary support, no consideration of substance permeation is required, and as long as the temporary support can be immobilized for forming the membrane, any material may as well used, for example, including a PET film and a metal plate such as an aluminum plate.

Moreover, the composition of the present invention can be soaked into the porous support to allow curing without using a support other than the porous support.

The composition of the present invention can be applied to the porous support layer by, for example, curtain coating, extrusion coating, air-knife coating, slide coating, nip roll coating, forward roll coating, reverse roll coating, dip coating, kiss coating, rod bar coating or spray coating. The coating of multiple layers can be done simultaneously or consecutively. For simultaneous coating of multiple layers, curtain coating, slide coating, slot die coating and extrusion coating are preferred.

Accordingly, in a preferred method, the composition of the present invention is continuously produced on the moving support, further preferably, according to a production unit including a composition application unit, an irradiation source for curing the composition, a membrane collection unit and a means for moving the support from the above-described composition application unit to the irradiation source and the membrane collection unit.

In a preferred production process of the present invention, the functional polymer membrane of the present invention is produced through a process of (i) applying and/or impregnating the composition for forming the functional polymer membrane according to the present invention into the porous support, (ii) allowing the reaction of curing the composition by irradiation with light, and (iii) removing the membrane formed in compliance with desire from the support.

The above-described composition application unit can be placed in a position upstream of the irradiation source, and the irradiation source is placed in a position upstream of the membrane collection unit.

In order to apply the composition using a high-speed coating machine, the composition being the application liquid preferably has sufficient flowability. The composition of the present invention preferably has a viscosity of less than 4,000 m·Pas, more preferably from 1 to 1,000 mPa·s, and most preferably from 1 to 500 mPa·s, when measured at 35° C. For coating methods such as slide bead coating, the preferred viscosity is from 1 to 100 mPa·s when measured at 35° C.

If a high-speed coating technique is applied, the composition of the present invention can be applied onto the moving support at a rate exceeding 15 m/min, or exceeding 20 m/min, for example, and further at a high rate such as 60 m/min or 120 m/min or reaching 400 m/min at maximum.

When the functional polymer membrane is incorporated into the porous support in order to improve the mechanical strength, particularly as the support, one is preferably used in which the support is subjected to corona discharge treatment, glow discharge treatment, flame treatment or ultraviolet light irradiation treatment, as mentioned above, to improve wettability and adhesion strength.

The curing reaction is preferably initiated within 60 seconds, further preferably, within 15 seconds, particularly preferably, within 5 seconds, and most preferably, within 3 seconds after the composition of the present invention is applied or impregnated into the support.

Curing reaction time, in particular, exposure time (irradiation time) for the curing reaction is preferably less than 30 seconds, further preferably, less than 10 seconds, and preferably, less than 5 seconds, particularly preferably, less than 3 seconds, and most preferably, less than 2 seconds. In the above-described continuous coating method, the curing reaction time is determined by a rate at which the composition moving on the support passes through an irradiation beam and moves, while the irradiation with light is continuously performed.

When high-intensity energy rays, particularly, ultraviolet light (UV light) is used for the curing reaction, a considerable amount of heat may be generated. Therefore, in order to prevent overheat, cooling air is preferably used for a lamp and/or the support/membrane. Moreover, a significant dose of infrared light (IR light) is irradiated together with the ultraviolet light (UV light) in several cases, and therefore the ultraviolet light (UV light) is preferably irradiated through a filter of an IR reflective quartz plate.

As the energy rays for irradiation in the curing reaction, ultraviolet light is preferred. As a wavelength for irradiation in this case, a wavelength matching with an absorption wavelength of an arbitrary photoinitiator included in the composition is preferable, and for example, UV-A (400 to 320 nm), UV-B (320 to 280 nm) or UV-C (280 to 200 nm) is preferred.

An ultraviolet light source as the irradiation light source is a mercury arc lamp, a carbon arc lamp, a low pressure mercury lamp, a medium pressure mercury lamp, a high pressure mercury lamp, a swirl-flow plasma are lamp, a metal halide lamp, a xenon lamp, a tungsten lamp, a halogen lamp, laser and an ultraviolet light-emitting diode. Particularly preferred are ultraviolet light emitting lamps of the medium or high pressure mercury vapor type. In addition thereto, one is also preferred in which an additive such as metal halide is added to in order to modify an emission spectrum of the lamp. In most cases, lamps with emission maxima between 200 and 450 nm are particularly suitable.

The energy output of the irradiation source is preferably from 20 to 1,000 W/cm, preferably from 40 to 500 W/cm, but may be higher or lower as long as the desired exposure dose can be realized. The degree of cure is controlled by exposure intensity. The exposure dose is preferably at least 40 mJ/cm$^2$, more preferably between 100 and 2,000 mJ/cm$^2$, most preferably between 150 and 1,500 mJ/cm$^2$ as measured by High Energy UV Radiometer (UV Power Puck™ manufactured by EIT-Instrument Markets) in the U V-A range indicated by the apparatus. The exposure time can be freely selected, but the above-mentioned exposure time is preferred, and time less than 2 seconds is particularly preferred.

In high-speed coating, a plurality of irradiation sources are preferably used in order to attain a desired dose, and in this case, exposure intensity of the plurality of irradiation sources may be identical with or different from each other.

In the functional polymer membrane of the present invention, in particular, use of the membrane in ion exchange is mainly intended. However, the functional polymer membrane of the present invention is not limited to ion exchange, and can be preferably used also for reverse osmosis and gas separation.

EXAMPLES

Hereinafter, the present invention will be described in more detail with reference to examples, but the present invention is not limited to these examples. Unless otherwise noted, "part(s)" and "percent (%)" are on a mass basis.
(Synthesis of Polymerizable Compound Represented by Formula (1))

The exemplified polymerizable compound 1 described below was synthesized according to the following scheme.

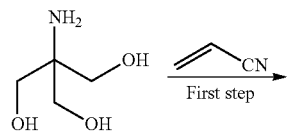

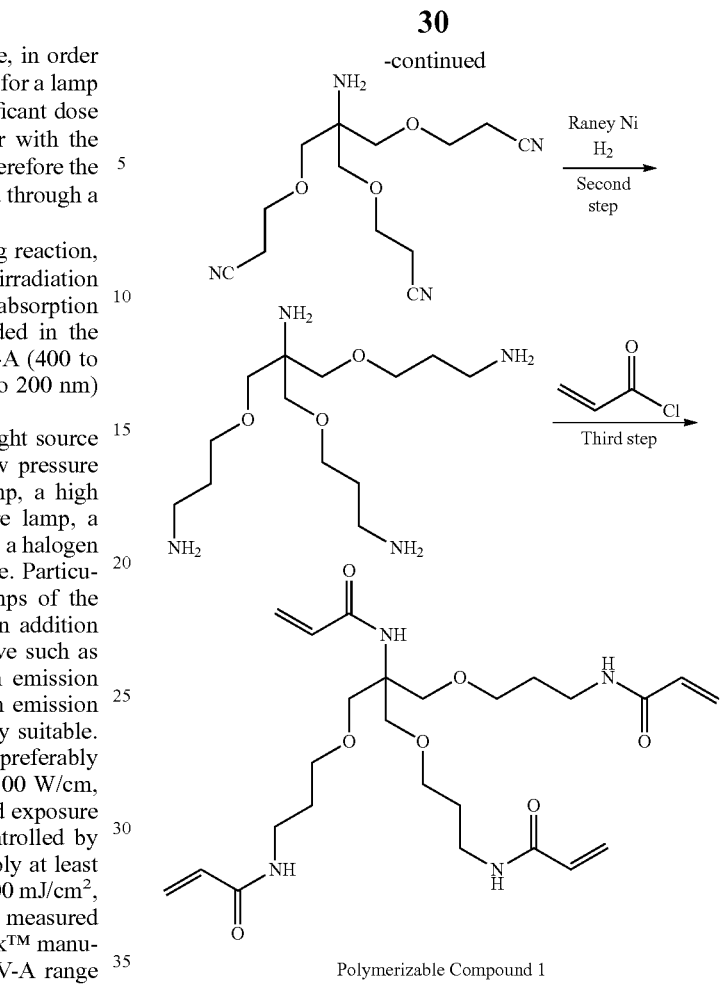

Polymerizable Compound 1

(First Step)

121 g (1 equivalent) of tris(hydroxymethyl)aminomethane (made by Tokyo Chemical Industry Co., Ltd.), 84 mL of 50% potassium hydroxide aqueous solution, and 423 mL of toluene were added to a 1-L capacity three-necked flask equipped with a stir bar and agitated, the reaction system was maintained at 20° C. to 25° C. in a water bath, and 397.5 g (7.5 equivalent) of acrylonitrile was dropped over 2 hours. After agitating for 1.5 hours after the dropping, 540 mL of toluene was added to the reaction system, the reaction mixture was moved to a separating funnel, and the water layer was removed. The remaining organic layer was dried with magnesium sulfate, thereafter celite filtration was performed, and the solvent was distilled off under reduced pressure, whereby an acrylonitrile adduct was obtained. The result of analysis by $^1$H NMR and MS of the obtained substance showed a good match with the $^1$H NMR spectrum of the known substances, so the substance was used in the next reduction reaction without further purification.
(Second Step)

24 g of the acrylonitrile adduct that was obtained first, 48 g of a Ni catalyst (Raney nickel 2,400, manufactured by W. R. Grace & Co.), and 600 mL of a 1:1 solution of 25% ammonia water and methanol were put into a 1-L capacity autoclave and suspended, and the reaction container was closed. Hydrogen at 10 Mpa was introduced to the reaction container and allowed to react for 16 hours at a reaction temperature of 25° C.

The disappearance of the raw materials was configured by $^1$H NMR, the reaction mixture was celite filtered, and the celite was washed several times with methanol. The solvent was distilled off at reduced pressure from the filtrate, whereby a polyamine body was obtained. The obtained substance was used in the next reaction without further purification.
(Third Step)

30 g of the polyamine body that was obtained first, 120 g (14 equivalent) of NaHCO$_3$, 1 L of dichloromethane, and 50 mL of water were added to a 2-L capacity three-necked flask equipped with an agitator, 92.8 g (10 equivalent) of acryloyl chloride was dropped over 3 hours in an ice bath, and thereafter the mixture was agitated for 3 hours at room temperature. The disappearance of the raw materials was configured by $^1$H NMR, thereafter the solvent was distilled off at reduced pressure from the reaction mixture, the reaction mixture was dried with magnesium sulfate, celite filtration was performed, and the solvent was distilled off under reduced pressure. Finally, the mixture was purified by column chromatography (ethyl acetate/methanol=4:1), whereby a white solid (yield 40%) was obtained at normal temperature. The yield of the three steps was 40%.

$^1$H-NMR of the resultant white solid was measured under the measuring conditions described below, and the solid was confirmed to be a target polymerizable compound 1. FIG. 1 shows a $^1$H-NMR spectrum.

$^1$H-NMR solvent: Deuterated chloroform, Internal standard: TMS
(Synthesis of Polymerizable Compound Represented by Formula (MA))

The exemplified polymerizable compound MA-1 described below was synthesized according to the following scheme.

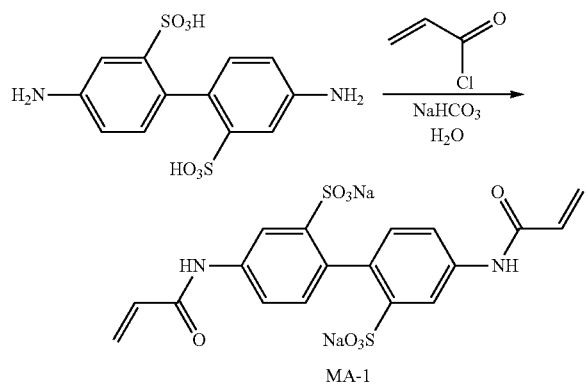

MA-1

In a 5 L three-necked flask, 288.29 g (3.43 mol) of sodium hydrogencarbonate (product No.: 195-01303, manufactured by Wako Pure Chemical Industries, Ltd.) and 1,343 mL of ion exchange water were put, and while the resultant mixture was stirred under room temperature, 268.6 g (0.78 mol) of 4,4'-benzidine-2,2'-disulfonic acid (product No.: B0395, manufactured by Tokyo Chemical Industry Co., Ltd.) was added little by little thereto. The resultant mixture was stirred for 30 minutes under room temperature, and then cooled under ice cooling and continuously stirred. While the mixture was stirred under ice cooling, 138.7 mL (1.53 mol) of acryloyl chloride (product No.: 013-12485, manufactured by Wako Pure Chemical Industries, Ltd.) was added dropwise little by little so as to keep the inside of system at 10° C. or lower. After completion of dropwise addition, the resultant mixture was stirred under ice cooling for 1 hour, and then for 3 hours under room temperature. To the reaction mixture, 2,686 mL of isopropyl alcohol was added little by little, and a formed insoluble matter was removed by filtration. The resultant filtrate was transferred to a 30 L stainless steel bucket, and while the filtrate was stirred under room temperature, 10.744 mL of isopropyl alcohol was added little by little thereto. The resultant crystal was obtained by filtration, and then the crystal was washed with 1,074 mL of mixed solution of isopropyl alcohol: water (5:1) to obtain 339 g (yield: 87%) of a target compound (MA-1).

$^1$H-NMR (300 MHz, DMSO-d6) δ: 10.3 (s, 2H), 8.09 (d, J=2.4 Hz, 2H), 7.71 (dd, J=2.4, 8.4 Hz, 2H), 7.16 (d, J=8.4 Hz, 2H), 7.71 (dd. J=2.4, 8.4 Hz, 2H)

Example 1

Synthesis of Cation Exchange Membrane

An application liquid of a composition having a formulation shown in Table 1 below was manually applied to an aluminum plate at a rate of approximately 5 m/min using a 150-μm wire-wound rod, and subsequently the application liquid was impregnated into a non-woven fabric (FO-2223-10, 100 μm in thickness, manufactured by Freudenberg & Co. KG). An excess application liquid was removed using a rod around which no wire was wound. A temperature of the application liquid during application was approximately 40° C. A cation exchange membrane was prepared using a UV exposure system (model: Light Hammer 10, D-valve, conveyer speed: 15 m/min. 100% strength, manufactured by Fusion UV Systems Inc.) and carrying out a reaction of curing of the above-described application liquid-impregnated support. An exposure amount was 750 mJ/cm$^2$ in a UV-A region. The resultant membrane was removed from the aluminum plate, and stored in a 0.1 M NaCl solution at least for 12 hours.

Examples 2 to 7

Cation exchange membranes in Example 2 to 7 were prepared in the same manner as in the preparation of the cation exchange membrane of Example 1 except that the formulation was changed to the formulations shown in Table 1 below, respectively.

Comparative Examples 1 to 4

Cation exchange membranes in Comparative Examples 1 to 4 were prepared in the same manner as the preparation of the cation exchange membrane of Example 1 except that the formulation was changed to the formulations described in Table 1 below, respectively.

TABLE 1

| Role | Abbreviation | Example 1 mass (g) | Example 2 mass (g) | Example 3 mass (g) | Example 4 mass (g) | Example 5 mass (g) | Example 6 mass (g) | Example 7 mass (g) |
|---|---|---|---|---|---|---|---|---|
| Solvent | PW | 12.50 | 12.50 | 32.33 | 32.82 | 32.33 | 12.5 | 25.5 |
| Polymerization inhibitor | Genorad 16 | 0.50 | 0.50 | 0.33 | 0.33 | 0.31 | 0.50 | 0.33 |

TABLE 1-continued

| Role | Abbreviation | | | | | | | |
|---|---|---|---|---|---|---|---|---|
| Neutralizing agent | LiOH•H₂O | 6.38 | 8.50 | — | — | — | 8.50 | — |
| Neutralizing agent | NaOH | — | — | 3.66 | 5.44 | 1.26 | — | 5.44 |
| Cationic monomer | AMPS | 32.08 | 42.77 | 18.97 | 28.24 | 6.52 | 42.77 | 28.25 |
| Solvent | IPA | 18.10 | 18.10 | — | — | — | 13.58 | 7.26 |
| Crosslinking agent | Polymerizable Compound 1 | 26.80 | 16.11 | — | — | — | 16.11 | — |
| Crosslinking agent | MA-1 | — | — | 42.72 | 31.21 | 50.54 | — | 31.71 |
| Crater preventative | Tego Glide 432 | 1.00 | 1.00 | 1.00 | 1.00 | 1.00 | 1.00 | 0.98 |
| Polymerization initiator | Darocur 1173 | 0.50 | 0.50 | 1.00 | 1.00 | 1.00 | 0.50 | 0.5 |

| Role | Abbreviation | Comparative Example 1 mass (g) | Comparative Example 2 mass (g) | Comparative Example 3 mass (g) | Comparative Example 4 mass (g) |
|---|---|---|---|---|---|
| Solvent | PW | 12.50 | 32.33 | 16.25 | 42.5 |
| Polymerization inhibitor | Genorad 16 | 0.50 | 0.33 | 0.50 | 0.33 |
| Neutralizing agent | LiOH•H₂O | 10.62 | — | 8.50 | — |
| Neutralizing agent | NaOH | — | 2.26 | — | 5.44 |
| Cationic monomer | AMPS | 53.46 | 6.52 | 42.77 | 28.25 |
| Solvent | IPA | 18.10 | — | 23.53 | 12.5 |
| Crosslinking agent | Polymerizable Compound 1 | 5.42 | — | 16.11 | — |
| Crosslinking agent | MA-1 | 5.42 | 56.54 | — | 31.5 |
| Crater preventative | Tego Glide 432 | 1.00 | 1.00 | 1.00 | 0.98 |
| Polymerization initiator | Darocur 1173 | 0.50 | 1.00 | 0.5 | 0.5 |

[Explanation of the Abbreviations in Table 1]
PW: Pure water
Genorad 16: trade name, manufactured by Rahn AG
AMPS: 2-Acrylamide-2-methylpropanesulfonic acid [Exemplified Compound (B-9)]
IPA: Isopropyl alcohol
Tego Glide 432: trade name, manufactured by Evonik industries
Darocur 1173: trade name, manufactured by Ciba Specialty Chemicals Inc.

For the cation exchange membranes prepared in Examples 1 to 7 and Comparative Examples 1 to 4, the following items were evaluated. The results obtained were shown in Table 2 below.

[Measurement Condition of SEM]

The membrane for measurement was coated with 1.5 nm-Pt, and measurement was carried out under the following conditions.
Accelerating voltage: 2 kV
Working distance: 4 mm
Aperture: 4
Magnification: 100,000 times
Tilted view: 3°

[Electrical Resistance of Membrane ($\Omega \cdot cm^2$)]

Both sides of the membrane immersed into a 0.5 M NaCl aqueous solution for about 2 hours were wiped off using a dry filter paper, and the membrane was interposed between two chambers of a two-chamber cell (effective membrane area: 1 cm², platinum electrodes were used as electrodes). Both chambers were filled with 100 mL of NaCl having an identical concentration, and the cell was placed in a constant-temperature water bath at 25° C., and allowed to stand until the cell reached equilibrium. A liquid temperature in the cell exactly reached 25° C., and then electrical resistance $r_1$ was measured using an alternative current bridge (frequency: 1,000 Hz). A NaCl concentration for measurement was adjusted to 0.5 M, 0.7 M, 1.5 M, 3.5 M and 4.5 M, and measurement was carried out from a low concentration liquid in the concentration order. Next, the membrane was removed, and the liquid was adjusted only to a 0.5 M NaCl aqueous solution, and electrical resistance $r_2$ between both electrodes was measured to determine electrical resistance r from a difference: $r_1-r_2$.

In Table 2 below, "electrical resistance of membrane" was abbreviated as "membrane resistance" and described.

[Pore Volume Fraction (%) of a Membrane]

Electrical conductivity A (S/cm²) of a membrane was calculated, according to the following Formula (a), from electrical resistance R of the membrane as measured in the NaCl liquid of 0.5 M, 0.7 M, 1.5 M, 3.5 M and 4.5 M.

$$A \text{ (S/cm}^2\text{)}=1/R \qquad \text{Formula (a)}$$

Next, electrical conductivity in each NaCl concentration solution and a membrane thickness were measured, and solution electrical conductivity per unit membrane thickness B (S/cm²) in each NaCl concentration solution was calculated. When a graph was prepared by setting the electrical conductivity A of this membrane as y-axis, and the solution electrical conductivity per unit membrane thickness B in each NaCl concentration solution as x-axis, a y-intercept of an approximated curve of plots obtained was taken as C, and a pore volume fraction was calculated according to the following Formula (b).

$$\text{Pore volume fraction}=(A-C)/B \qquad \text{Formula (b)}$$

Ionic permselectivity was calculated by measuring membrane potential (V) by measurement of static membrane potential. Two electrolytic cells (cells) were separated by a measured membrane. Before measurement, the membrane achieved equilibrium in a 0.05 M NaCl aqueous solution in about 16 hours. Then, NaCl aqueous solutions having different concentrations were poured into cells on a side facing with the measured membranes, respectively.

Into one cell, 100 mL, of 0.05 M NaCl aqueous solution was poured. Into the other cell, 100 mL of 0.5 M NaCl aqueous solution was poured.

In a constant temperature bath, a temperature of the NaCl aqueous solution in the cell was stabilized at 25° C., and then while both liquids were flowed toward the membrane face, both electrolytic cells and an Ag/AgCl reference electrode (manufactured by Metrohm AG) were connected with a salt bridge to measure membrane potential (V), and transport number t was calculated according to the following formula (c).

In addition, an effective area of the membrane was 1 cm².

$$t=(a+b)/2b \quad \text{Formula (c)}$$

A detail of each sign in the above-described formula (c) is shown below.
a: Membrane potential (V)
b: 0.5915 log($f_1c_1/f_2c_2$) (V)
$f_1$ and $f_2$: NaCl activity coefficients in both cells
$c_1$ and $c_2$: NaCl concentrations (M) in both cells
[Water Permeability (mL/m²/Pa/hr)]

Water permeability of the membrane was measured using a device having a flow channel 10 shown in FIG. 1. In FIG. 1, sign 1 represents a membrane, and signs 3 and 4 represent flow channels of a feed solution (pure water) and a draw solution (3 M NaCl), respectively. An arrow of sign 2 shows a flow of water separated from the feed solution.

Through the membrane, 400 mL of feed solution and 400 mL of draw solution were brought into contact (membrane contact area 18 cm²), and each solution was allowed to flow at a rate of 0.11 cm/sec in a direction of an arrow of a sign 5 using a Perista pump. A rate at which water in the feed solution permeates into the draw solution through the membrane was analyzed by measuring masses of the feed solution and the draw solution on a real time basis to determine the water permeability.

Having described our invention as related to the present embodiments, it is our intention that the invention not be limited by any of the details of the description, unless otherwise specified, but rather be construed broadly within its spirit and scope as set out in the accompanying claims.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Membrane
2 Arrow showing that water in a feed solution permeates into a draw solution through a membrane
3 Flow channel of feed solution
4 Flow channel of draw solution
5 Direction of movement of a liquid
10 Flow channel in a device for measuring water permeability

The invention claimed is:
1. A functional polymer membrane having a pore volume fraction of 0.6% or more and 3.0% or less prepared by allowing a reaction of curing a composition containing a polymerizable compound (A) and a copolymerizable monomer (B),
   wherein the polymerizable compound (A) has at least two ethylenically unsaturated groups in its molecule, and is water soluble, and
   wherein a solid content of the polymerizable compound (A) is 20 to 85 parts by mass based on 100 parts by mass of the total solid content in the composition.
2. The functional polymer membrane according to claim 1, wherein the polymerizable compound (A) is a compound selected from the group consisting of a (meth)acrylate

TABLE 2

|  | Example 1 | Example 2 | Example 3 | Example 4 | Example 5 | Example 6 | Example 7 |
|---|---|---|---|---|---|---|---|
| Membrane thickness (μm) | 110 | 111 | 161 | 159 | 151 | 135 | 151 |
| Pore volume fraction (%) | 1.36 | 1.92 | 0.70 | 1.45 | 1.20 | 2.24 | 1.10 |
| Transport number | 0.97 | 0.95 | 0.98 | 0.97 | 0.97 | 0.95 | 0.97 |
| Water permeability (mL/m²/Pa/hr) | $7.74 \times 10^{-5}$ | $11.35 \times 10^{-5}$ | $3.30 \times 10^{-5}$ | $5.95 \times 10^{-5}$ | $5.30 \times 10^{-5}$ | $11.60 \times 10^{-5}$ | $5.30 \times 10^{-5}$ |
| Membrane resistance (Ω·cm²) NaCl 0.5M | 3.45 | 1.33 | 4.33 | 3.46 | 4.35 | 1.99 | 3.65 |
| Membrane resistance (Ω·cm²) NaCl 4.5M | 1.89 | 0.95 | 2.50 | 2.11 | 2.16 | 1.18 | 2.51 |
| (A) Polymerizable Compound/(B) Copolymerizable monomer (molar ratio) | 0.34 | 0.15 | 0.94 | 0.46 | 3.24 | 0.38 | 1.12 |

|  | Comparative Example 1 | Comparative Example 2 | Comparative Example 3 | Comparative Example 4 |
|---|---|---|---|---|
| Membrane thickness (μm) | 175 | 124 | 166 | 144 |
| Pore volume fraction (%) | 15.09 | 0.57 | 3.80 | 3.11 |
| Transport number | 0.53 | 0.99 | 0.90 | 0.92 |
| Water permeability (mL/m²/Pa/hr) | $34.08 \times 10^{-5}$ | $3.20 \times 10^{-5}$ | $16.50 \times 10^{-5}$ | $14.20 \times 10^{-5}$ |
| Membrane resistance (Ω·cm²) NaCl 0.5M | 0.55 | 6.50 | 1.70 | 2.94 |
| Membrane resistance (Ω·cm²) NaCl 4.5M | 0.38 | 2.90 | 1.00 | 2.26 |
| (A) Polymerizable Compound/(B) Copolymerizable monomer (molar ratio) | 0.04 | 3.53 | 0.38 | 1.12 |

As is apparent from Table 2, all of the cation exchange membranes in Examples 1 to 7 in which the pore volume fraction is in the range defined in the present invention were low in the membrane resistance and the water permeability in a wide-ranged concentration region, and showed good results also for the transport number. In contrast, the cation exchange membranes in Comparative Examples 1 to 4 in which the pore volume fraction is outside of the range defined in the present invention were inferior in any one of the membrane resistance and the water permeability in comparison with all of the cation exchange membranes in Examples 1 to 7.

compound, a (meth)acrylamide compound, a vinyl ether compound, an aromatic vinyl compound, an N-vinylamide compound, and an allyl compound.

3. The functional polymer membrane according to claim 1, wherein the polymerizable compound (A) is a compound represented by Formula (1), and wherein the copolymerizable monomer (B) is a monofunctional polymerizable compound,

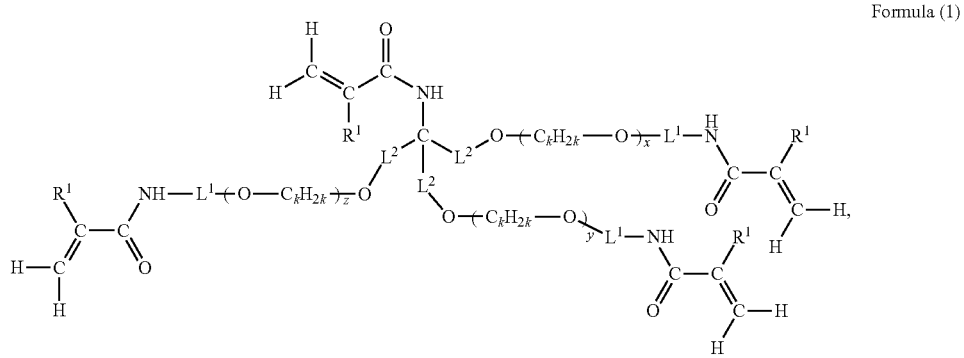

Formula (1)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

4. The functional polymer membrane according to claim 1, wherein molar ratio r of the polymerizable compound (A) to the copolymerizable monomer (B) is 0.1<r<3.5.

5. The functional polymer membrane according to claim 1, wherein the copolymerizable monomer (B) has a dissociative group.

6. The functional polymer membrane according to claim 5, wherein the dissociative group is a sulfo group or a salt thereof, or a carboxy group or a salt thereof.

7. The functional polymer membrane according to claim 5, wherein the dissociative group is selected from the group consisting of a sulfo group or a salt thereof, a carboxy group or a salt thereof, an ammonio group and a pyridinio group.

8. The functional polymer membrane according to claim 1, wherein the copolymerizable monomer (B) is a (meth)acrylate compound or a (meth)acrylamide compound, each of which has a chemical structure different from that of the polymerizable compound (A).

9. The functional polymer membrane according to claim 1, which contains a support.

10. The functional polymer membrane according to claim 9, wherein the support is a synthetic woven fabric or a synthetic non-woven fabric, a sponge-like film or a film having microscopic through-holes.

11. The functional polymer membrane according to claim 9, wherein the support is made from polyolefin.

12. The functional polymer membrane according to claim 1, wherein the functional polymer membrane is an ion exchange membrane, a reverse osmosis membrane, a forward osmosis membrane, or a gas separation membrane.

13. The functional polymer membrane according to claim 1, wherein a water uptake of the functional composite membrane is less than 70% based on the mass of a dry membrane.

14. The functional polymer membrane according to claim 1, wherein the polymerizable compound (A) is water soluble in the degree that at least 50 parts by mass are dissolved into 100 parts by mass of distilled water at 25° C.

15. A method of producing a functional polymer membrane, comprising the step of:

allowing a reaction of curing a composition containing a polymerizable compound (A) and a copolymerizable monomer (B), thereby adjusting a pore volume fraction to 0.6% or more and 3.0% or less, wherein the polymerizable compound (A) has at least two ethylenically unsaturated groups in its molecule, and is water soluble, and wherein a solid content of the polymerizable compound (A) is 20 to 85 parts by mass based on 100 parts by mass of the total solid content in the composition.

16. The method of producing a functional polymer membrane according to claim 15, wherein the polymerizable compound (A) is a compound represented by Formula (1), and wherein the copolymerizable monomer (B) is a monofunctional polymerizable compound,

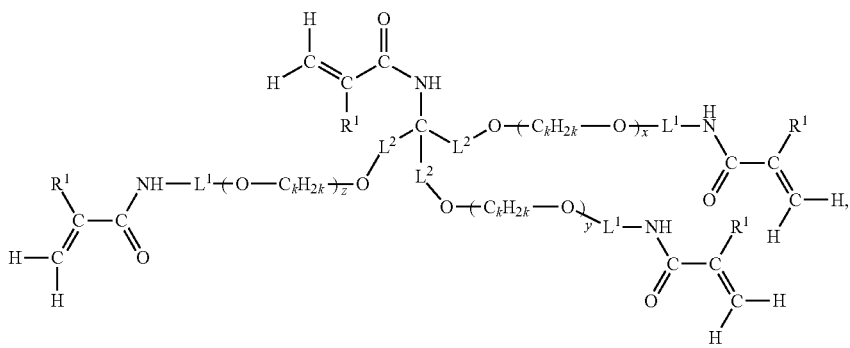

Formula (1)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

17. The method of producing a functional polymer membrane according to claim 15, wherein a solvent (C) is contained in the composition, and a content of the solvent (C) is 1 to 35 parts by mass based on 100 parts by mass of the total mass of the composition.

18. The method of producing a functional polymer membrane according to claim 17, wherein the solvent (C) is water or a water-miscible solvent.

19. The method of producing a functional polymer membrane according to claim 15, comprising the steps of:

applying and/or impregnating the composition to a support; and allowing a reaction of curing the composition to form a membrane.

20. The method of producing a functional polymer membrane according to claim 15, wherein the curing reaction includes a curing reaction due to polymerization of the composition by irradiating the composition with energy rays.

* * * * *